(12) United States Patent
Wilkinson et al.

(10) Patent No.: US 7,503,011 B2
(45) Date of Patent: Mar. 10, 2009

(54) MODULAR DIGITAL IMAGING SYSTEM USER INTERFACE

(75) Inventors: Larry W. Wilkinson, Rochester, NY (US); Joseph A. Manico, Rochester, NY (US); John R. Fredlund, Rochester, NY (US); Steven M. Belz, Pittsford, NY (US); Anthony L. Tintera, Hamlin, NY (US)

(73) Assignee: Eastman Kodak Company, Rochester, NY (US)

( * ) Notice: Subject to any disclaimer, the term of this patent is extended or adjusted under 35 U.S.C. 154(b) by 763 days.

(21) Appl. No.: 10/397,696

(22) Filed: Mar. 26, 2003

(65) Prior Publication Data

US 2003/0202013 A1    Oct. 30, 2003

Related U.S. Application Data

(60) Provisional application No. 60/367,586, filed on Mar. 26, 2002.

(51) Int. Cl.
*G06F 3/048* (2006.01)
*G06F 3/00* (2006.01)

(52) U.S. Cl. .................. 715/765; 715/781; 715/866

(58) Field of Classification Search .................. 715/765, 715/700; 348/207.1, 373, 333.02
See application file for complete search history.

(56) References Cited

U.S. PATENT DOCUMENTS

| | | | | |
|---|---|---|---|---|
| 4,642,678 A | * | 2/1987 | Cok | 348/242 |
| 5,396,264 A | * | 3/1995 | Falcone et al. | 715/811 |
| 5,477,264 A | * | 12/1995 | Sarbadhikari et al. | 348/231.6 |
| 5,887,165 A | * | 3/1999 | Martel et al. | 713/100 |
| 5,905,486 A | * | 5/1999 | Brittenham et al. | 345/157 |
| 5,999,213 A | * | 12/1999 | Tsushima et al. | 348/180 |
| 6,012,083 A | * | 1/2000 | Savitzky et al. | 709/202 |
| 6,023,587 A | * | 2/2000 | Watts et al. | 710/72 |
| 6,137,686 A | * | 10/2000 | Saye | 361/732 |
| 6,141,221 A | * | 10/2000 | Tong et al. | 361/724 |
| 6,144,888 A | * | 11/2000 | Lucas et al. | 700/83 |
| 6,179,489 B1 | * | 1/2001 | So et al. | 718/102 |
| 6,275,882 B1 | * | 8/2001 | Cheever et al. | 710/302 |
| 6,292,218 B1 | | 9/2001 | Parulski et al. | |
| 6,300,976 B1 | * | 10/2001 | Fukuoka | 348/231.99 |
| 6,310,648 B1 | * | 10/2001 | Miller et al. | 348/333.05 |
| 6,337,712 B1 | * | 1/2002 | Shiota et al. | 348/231.1 |

(Continued)

OTHER PUBLICATIONS http://www.twain.org/download.htm Jan. 2001.*

(Continued)

*Primary Examiner*—Steven B Theriault
(74) *Attorney, Agent, or Firm*—Peyton C. Watkins

(57) ABSTRACT

System and method for creating a graphical user interface. The method comprises the steps of: providing a removable display device having a display for displaying digital images stored on the display device, the display device including a graphical user interface, the display device having a electrical connector; providing a functional module electrically interfaceable with the display device, the functional module providing a function and including stored data to configure the graphical user interface to control the function of the functional module from the display device; automatically transferring the stored data from the functional module to the display device when the functional module is electrically interfaced with the display device; and using the transferred data to configure the graphical user interface.

17 Claims, 17 Drawing Sheets

U.S. PATENT DOCUMENTS

| | | | | |
|---|---|---|---|---|
| 6,470,413 B1* | 10/2002 | Ogawa | | 711/103 |
| 6,505,087 B1* | 1/2003 | Lucas et al. | | 700/83 |
| 6,587,129 B1* | 7/2003 | Lavendel et al. | | 715/776 |
| 6,608,650 B1* | 8/2003 | Torres et al. | | 348/333.02 |
| 6,661,648 B2* | 12/2003 | Dayley | | 361/683 |
| 6,700,592 B1* | 3/2004 | Kou et al. | | 715/771 |
| 6,734,915 B2* | 5/2004 | Nagaoka | | 348/375 |
| 6,738,091 B1* | 5/2004 | Eouzan et al. | | 348/211.14 |
| 6,750,902 B1* | 6/2004 | Steinberg et al. | | 348/211.3 |
| 6,774,885 B1* | 8/2004 | Even-Zohar | | 345/156 |
| 6,774,935 B1* | 8/2004 | Morimoto et al. | | 348/211.5 |
| 6,795,318 B2* | 9/2004 | Haas et al. | | 361/729 |
| 6,819,355 B1* | 11/2004 | Niikawa | | 348/207.11 |
| 6,833,867 B1* | 12/2004 | Anderson | | 348/231.9 |
| 6,886,056 B2* | 4/2005 | Ohmura | | 710/62 |
| 6,944,700 B2* | 9/2005 | Bateman et al. | | 710/300 |
| 6,980,234 B2* | 12/2005 | Kitawaki | | 348/207.1 |
| 7,039,876 B2* | 5/2006 | Lavendel et al. | | 715/777 |
| 7,050,042 B2* | 5/2006 | Watanabe | | 345/156 |
| 7,073,124 B1* | 7/2006 | Suetsugu et al. | | 715/700 |
| 7,119,835 B2* | 10/2006 | Gennetten et al. | | 348/207.2 |
| 7,301,561 B2* | 11/2007 | Ohmura | | 348/207.1 |
| 2001/0034803 A1* | 10/2001 | Sorek et al. | | 710/129 |
| 2002/0064255 A1* | 5/2002 | Mohammadian et al. | | 379/21 |
| 2002/0071035 A1* | 6/2002 | Sobol | | 348/207 |
| 2002/0101534 A1* | 8/2002 | Liu | | 348/375 |
| 2002/0149695 A1* | 10/2002 | Kayanuma | | 348/375 |
| 2003/0038880 A1* | 2/2003 | No | | 348/207.1 |
| 2003/0117499 A1* | 6/2003 | Bianchi et al. | | 348/211.2 |
| 2003/0149816 A1* | 8/2003 | Poo et al. | | 710/62 |
| 2003/0160822 A1* | 8/2003 | Belz et al. | | 345/762 |
| 2003/0160890 A1* | 8/2003 | Caspe et al. | | 348/372 |
| 2003/0174813 A1* | 9/2003 | Mohammadian et al. | | 379/22 |
| 2003/0185302 A1* | 10/2003 | Abrams, Jr. | | 375/240.12 |
| 2004/0004737 A1* | 1/2004 | Kahn et al. | | 358/1.15 |
| 2004/0061783 A1* | 4/2004 | Choi et al. | | 348/207.1 |
| 2004/0141066 A1* | 7/2004 | Ohmori et al. | | 348/211.2 |
| 2004/0201680 A1* | 10/2004 | Gennetten et al. | | 348/207.1 |
| 2004/0201774 A1* | 10/2004 | Gennetten | | 348/375 |
| 2004/0208293 A1* | 10/2004 | Mohammadian et al. | | 379/21 |
| 2004/0259499 A1* | 12/2004 | Oba et al. | | 455/41.2 |
| 2005/0275729 A1* | 12/2005 | Billerbeck | | 348/222.1 |
| 2006/0010374 A1* | 1/2006 | Corrington et al. | | 715/517 |
| 2006/0066753 A1* | 3/2006 | Gennetten et al. | | 348/375 |
| 2006/0070108 A1* | 3/2006 | Renkis | | 725/105 |
| 2006/0116787 A1* | 6/2006 | Etter et al. | | 700/180 |

OTHER PUBLICATIONS http://www.microsoft.com/technet/prodtechnol/Windows2000Pro/reskit/part3/proch15.mspx?mfr=true.* http://www.apple.com/support/switch101/connect/.*

U.S. Appl. No. 10/368,171 titled System and Method for Creating Graphical User Interfaces field on Feb. 18, 2003 in the names of Belz, et al.

* cited by examiner

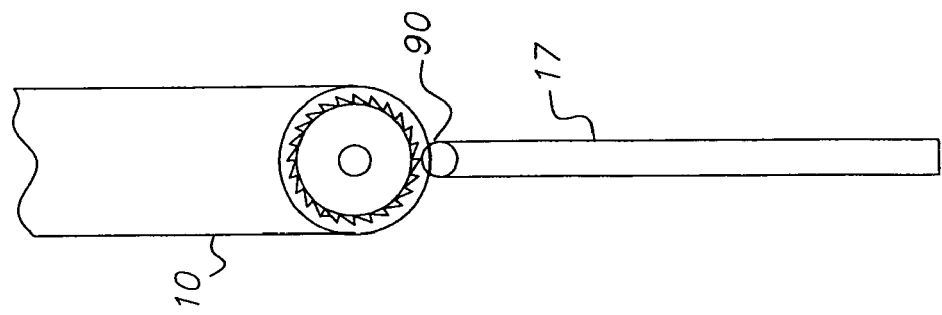
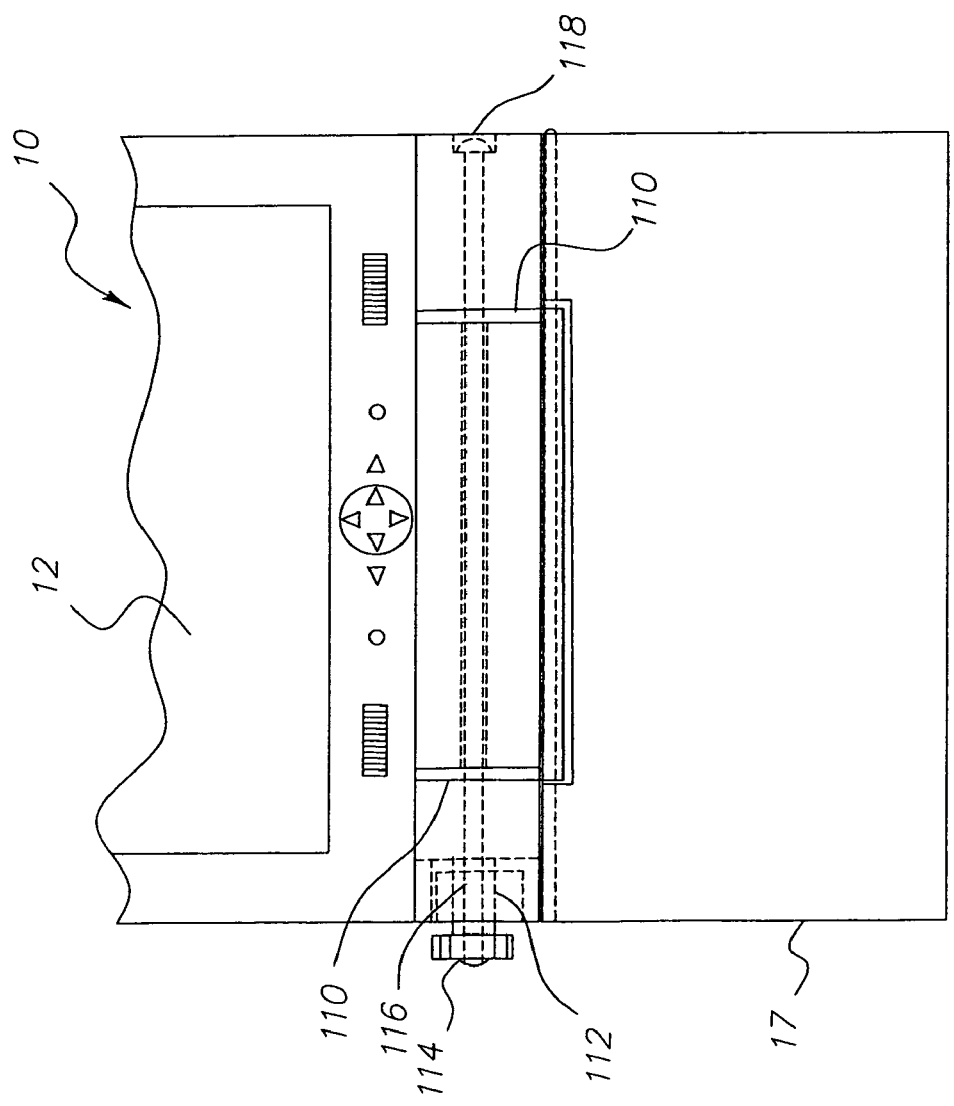

MODULAR DIGITAL IMAGING SYSTEM USER INTERFACE

CROSS REFERENCE TO RELATED APPLICATION

Priority is claimed from Provisional Application U.S. Ser. No. 60/367,586 filed on Mar. 26, 2002, entitled "MODULAR DIGITAL IMAGING SYSTEM".

FIELD OF THE INVENTION

The present invention relates generally to digital imaging, and more particularly, to a user interface of a digital imaging system.

BACKGROUND OF THE INVENTION

Digital imaging systems are well known and include, for example, digital image capture devices, digital cameras, digital displays, camcorders, digital video recorders, computers, and kiosks.

Current digital cameras can connect to a host computer by means of a dock in order to transfer digital data to a computer. This digital data can include digital still images (e.g., JPEG files) as well as motion video files (e.g., Quick Time files). One example is the Kodak EasyShare DX3600 digital camera, which is sold with an optional docking unit. The camera captures digital still images and motion video segments, and stores the images using Flash EPROM memory. The still images and motion video files can be downloaded from the digital camera to the computer using the docking unit.

While such a digital camera has achieved a certain degree of success in its particular applications, there is a need for a digital imaging system which is modular, transportable, and which can be employed to share/transmit/archive/print/display digital images with or without the use of a computer.

SUMMARY OF THE INVENTION

An object of the present invention is to provide a digital imaging system which is modular, transportable, and can share digital images with or without the employment of a computer.

Another object of the present invention is to provide a user interface for such a digital imaging system.

Yet another object of the present invention is to provide a variety of modular components that can be combined by a user to form a custom product that has the appearance and function of an integrated system.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a method for creating a graphical user interface. The method comprises the steps of: providing a removable display device having a display for displaying digital images stored on the display device, the display device including a graphical user interface, the display device having a electrical connector; providing a functional module electrically interfaceable with the display device, the functional module providing a function and including stored data to configure the graphical user interface to control the function of the functional module from the display device; automatically transferring the stored data from the functional module to the display device when the functional module is electrically interfaced with the display device; and using the transferred data to configure the graphical user interface.

According to another aspect of the invention, there is provided a method for creating a graphical user interface. The method comprises the steps of: providing a removable display device having a display for displaying digital images stored on the display device, the display device including a graphical user interface, the display device having a electrical connector; providing a first and second functional modules, each module being electrically interfaceable with the display device, the functional modules providing different functions and each including stored data to configure the graphical user interface to control the function of the functional module from the display device; automatically transferring the stored data from the first functional module to the display device using the electrical connector when the first functional module is electrically interfaced with the display device; automatically transferring the stored data from the second functional module to the display device using the electrical connector when the second functional module is electrically interfaced with the display device; and using the transferred data from the first and second functional modules to configure the graphical user interface.

According to yet another aspect of the invention, there is provided a system for creating a graphical user interface. The system comprises: a removable display device having a display for displaying digital images stored on the display device, the display device including a graphical user interface, the display device having a electrical connector; a functional module electrically interfaceable with the display device, the functional module providing a function and including stored data to configure the graphical user interface to control the function of the functional module from the display device; means for automatically transferring the stored data from the functional module to the display device when the functional module is electrically interfaced with the display device; and means for using the transferred data to configure the graphical user interface.

BRIEF DESCRIPTION OF THE DRAWINGS

The foregoing and other objects, features, and advantages of the invention will be apparent from the following more particular description of the preferred embodiments of the invention, as illustrated in the accompanying drawings.

FIG. 26 shows a front view of the display device and cover member employing a hinged mechanism comprising a clutch.

FIG. 27 shows a side view of FIG. 26.

DETAILED DESCRIPTION OF THE INVENTION

Figure 1:
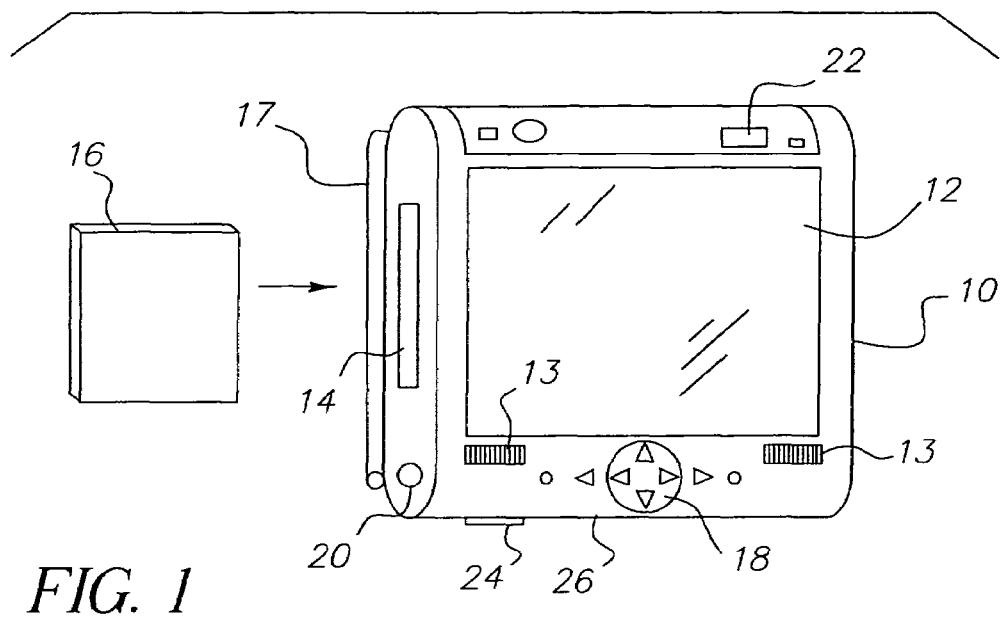
FIG. 1 shows a perspective view of a display device in accordance with the present invention.

The following is a detailed description of the preferred embodiments of the invention, reference being made to the drawings in which the same reference numerals identify the same elements of structure in each of the several figures.

Reference is also made to commonly assigned application U.S. Ser. No. 10/393,834 entitled "MODULAR DIGITAL IMAGING SYSTEM", filed on Mar. 21, 2003 and provisionally filed on Mar. 26, 2002 in the names of Manico et al, and which is assigned to the assignee of this application.

Reference is also made to commonly assigned application U.S. Ser. No. 10/394,862 entitled "DISPLAY MODULE FOR SUPPORTING A DIGITAL IMAGE DISPLAY DEVICE", filed on Mar. 21, 2003 and provisionally filed on Mar. 26, 2002 in the names of Manico et al, and which is assigned to the assignee of this application.

FIG. 1 shows a display device 10 in accordance with the present invention. Display device 10 comprises an image display 12 for displaying a digital image, and a receiving port 14 for receiving a digital data storage device 16. In FIG. 1, receiving port 14 is configured as a slot/aperture adapted to receive a digital storage device 16, such as a floppy disk, memory card, memory stick or CD. Image display 12 can be a color LCD, an organic light emitting display (OLED), or the like, as known to those skilled in the art. Accordingly, display device 10 can display motion video images and still digital images. Display device 10 preferably comprises at least one speaker 13.

Display device 10 can comprise a cover member 17, which is shown in FIG. 1 as being folded back away from display 12 to abut a side of display device 10 opposite display 12.

Display device 10 further comprises at least one selection member 18 for selecting and manipulating (e.g., zoom, crop, delete) a digital image displayed on display 12. FIG. 1 illustrates a plurality of selection members, shown as buttons, arrows, and a four-way selection button, which can be employed to provide instructions to display device 10 to display a digital image on display 12. Display 12 can be configured as a touch screen. Accordingly, a physical contact with display 12 would be used to select or provide instructions to display device 12. The physical contact with display 12 can be accomplished, for example, by a finger contacting display 12, or a stylus. A stylus can be provided with display device 10 and stored in an aperture 20 disposed in display device 10 for ready access by a user.

It is recognized that display device 10 can be an image capture device, such as a digital camera, video recorder, or camcorder, adapted to capture digital images, sound, and motion video images in addition to displaying digital images and motion video images. If display device 10 is configured as an image capture device, display device 10 would further comprise a flash member or other illumination device 22 as well as a lens and an activation member for activating display device 10 to capture an image. Still further, it is understood that display device 10 would then further include elements employed for image capture and image processing, such as an image sensor (e.g., CCD, CMOS), analog-to-digital converter, and digital image processor. An example of a digital camera which could be employed as display device 10 is disclosed in U.S. Pat. No. 6,292,218, issued Sep. 18, 2001, titled "Electronic camera for initiating capture of still images while previewing motion images", by Parulski et al, herein incorporated by reference.

Display device 10 can further comprise a communication port 24 for communicating with another device. Communication port 24 is shown in FIG. 1 as a USB connection disposed on a lower edge 26 of display device 10.

Figure 2:
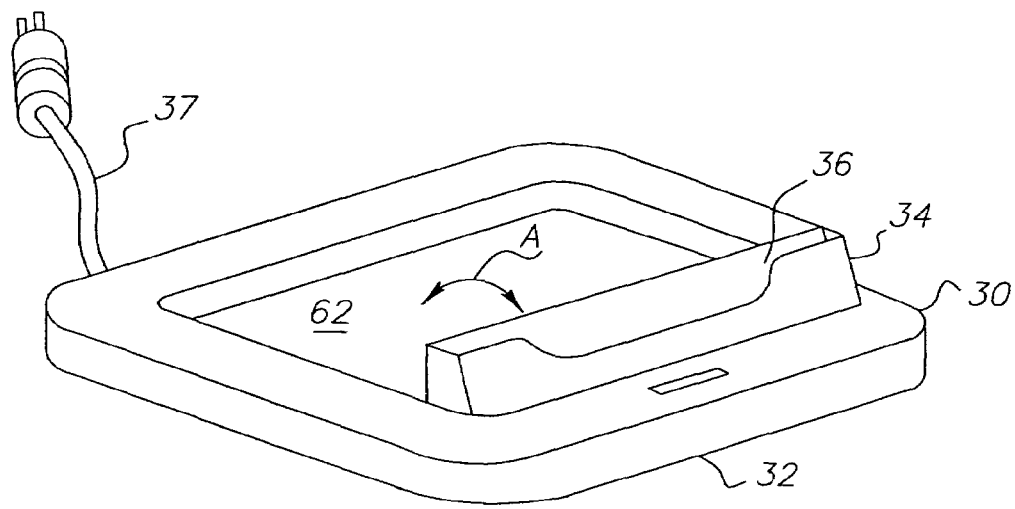
FIG. 2 shows a perspective view of a display module in accordance with the present invention.

Referring now to FIG. 2, there is shown a perspective view of a first module referred to, for ease of discussion, as a display dock or display module 30. Display module 30 comprises a body 32 and a support member 34 pivotably connected to body 32 so as to pivot in a direction as shown by arrow A in FIG. 2. The pivoting operation may be achieved by manual manipulation by the user or by a motor (not shown). Support member 34 comprises a recess 36 adapted to receive and support display device 10. When display device 10 is positioned in recess 36 and pivoted in a full horizontal position, display device 10 is encased by display module 30 in a display recess 62 and is protected by display module 30. Display module 30 can further comprise an electrical connector 37.

Figure 3:
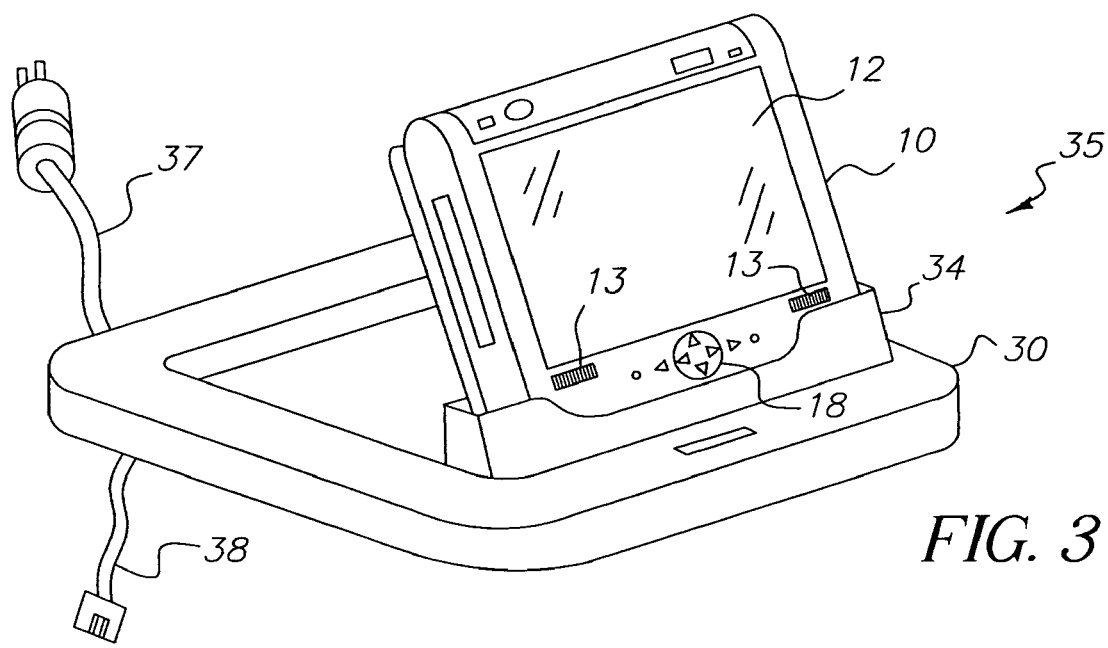
FIG. 3 shows a perspective view of a digital imaging system in accordance with the present invention comprising the display device shown in FIG. 1 and the display module shown in FIG. 2.

FIG. 3 shows display device 10 disposed within display module 30 to define a digital imaging system 35 in accordance with the present invention. As shown, lower edge 26 is inserted into recess 36 such that the portion of display device 10 adjacent lower edge 26 is supported within support member 34, permitting an unobstructed view of display 12 of display device 10. That is, an image displayed in display 12 can be viewed while display device 10 is docked within display module 30; display 12 is not obstructed from a user's view. Similarly, speakers 13 are unobstructed by support member 34 so as not to interfere with sound reproduction. Alternatively, display module 30 and support member 34 may be designed to incorporate sound directing ports and/or baffles to enhance the quality of the sound. Display module 30 acts as a holder or support for display device 10. Support member 34 can be pivoted to provide a preferred viewing angle of display 12 by a user. In a preferred embodiment, selection members 18 are accessible when display device 10 is supported by display module 30.

If display module 30 is provided with electrical connector 37, display module can be configured as a power source for display device 10 or as a charger for a power supply (e.g., battery) disposed within display device 10. Additionally, display recess 62 in display module 30 may incorporate an additional connector for charging additional batteries.

Disposed within recess 36 is a communication connector (not shown) which can be matingly connected with communication port 24 of display device 10 when display device 10 is docked within display module 30. When docked, a communication network is established by connecting communication port 24 and the communication connector, thereby permitting the transfer of digital data. For example, display module 30 can comprise a modem and a telephone connector 38 (shown in FIG. 3), whereby digital data can be transmitted by means of a telephone connection. It is recognized that other communication networks known to those skilled in the art can be employed in addition to a wired communication network, for example, a cellular or wireless communication network. An example of a wireless communication network is a radio frequency transponder and receiver disposed with display device 10 and display module 30.

Figure 4:
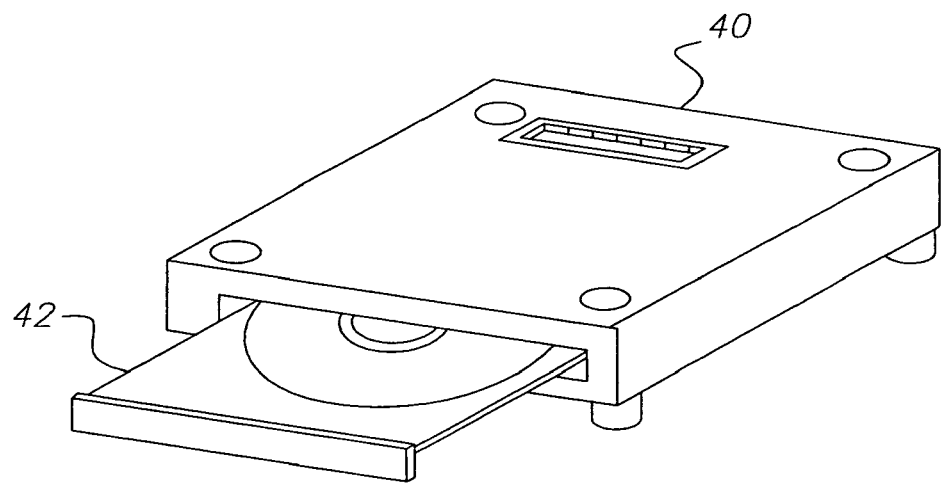
FIG. 4 shows a perspective view of a CD module.
Figure 5:
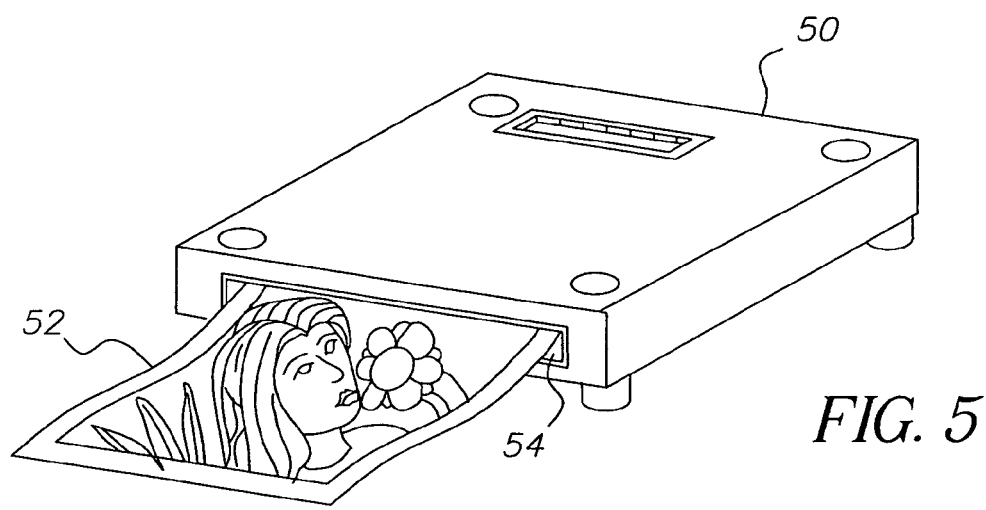
FIG. 5 shows a perspective view of a printer module.

Display module 30 is one example of a module that can be employed with display device 10. Additional modules can be employed with display device 10. A compact disc (CD) module 40 is shown in FIG. 4 as having an opening 42 through which to receive a CD for reading or writing to the CD, and a printer module 50 is shown in FIG. 5 for providing a hardcopy print 52 through a delivery aperture 54.

Figure 6:
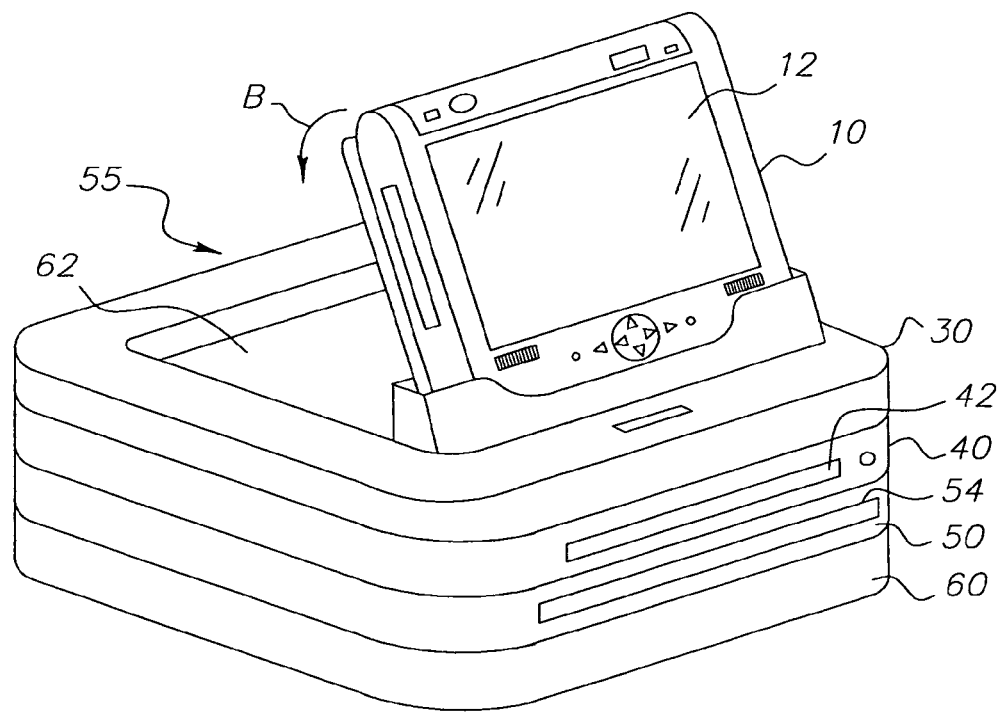
FIG. 6 shows a perspective view of a modular digital imaging system in accordance with the present invention.

Each module is configured to have a complementary shape such that when the modules abut, a modular system is provided. FIG. 6 generally illustrates a perspective view of a modular digital imaging system 55 in accordance with the present invention comprising display module 30 and at least one other module. The particular digital imaging system 55 shown in FIG. 6 comprises display module 30, CD module 40, printer module 50, and another module 60. Examples of other modules 60 include a DVD module for reading or writing DVDs, a telecommunication module (cellular, wired, or wireless), a videophone module, a stereo module for providing amplified stereo sound and high quality speakers, a battery pack module (for example, comprising a heavy duty battery for providing extended operation of the digital imaging system without recharging or connection to an electrical outlet), a hard drive module, a modem module, a television turner module, a digital tape drive module, computer connection module, illumination module, digital projector, film writer, film or print scanner, and an additional memory module.

Module 60 can be a "dummy" module. That is, it can be a decorative, functional, or non-functional module. For example, it can be a storage module having a recessed area for storage for batteries, cabling, manuals, print media, memory cards, CDs, or the like. Alternatively, the dummy module may serve as a base to raise the digital imaging system to a particular height for preferred viewing by a user. Alternatively, a transformer for providing electrical power can be disposed within a dummy module.

As configured, the modules are docking docks. That is, when a module is docked with another module, a system of docks is formed. The complementary shapes of the modules provides for an interlocking arrangement of the modules, which in addition to being aesthetically pleasing, provides a physically robust digital imaging system.

The modules can be arranged in a vertical orientation, as shown in FIG. 6. Alternatively, the modules can be arranged in a horizontal orientation with display device 10 being disposed on top of or adjacent to one of the modules.

With a modular system, the order of the modules is not relevant; any order can be employed, though in a preferred embodiment display device 10 is disposed on top for optimal viewing.

Access to the modules (e.g., 30, 40, 50, 60) is preferably in the same direction (i.e., on the same side) of digital imaging system 55, as shown in FIG. 6. Preferably, opening 42 of CD module 40 and delivery aperture 54 of printer module 50 are directed toward the viewer, so as to provide ready access to the modules. Likewise, display 12 is preferably arranged so as to be viewed forward regardless of lens orientation, in the same direction as the access to the modules, for viewing an image through display 12 when display device 10 is docked in display module 30. It may be preferred to orient the lens toward the user whenever the display device is inserted in display module 30 to facilitate two way visual communication. Similarly, access for any media (i.e., paper for printer module 50) would preferably be obtained from the same forward direction.

Figure 7:
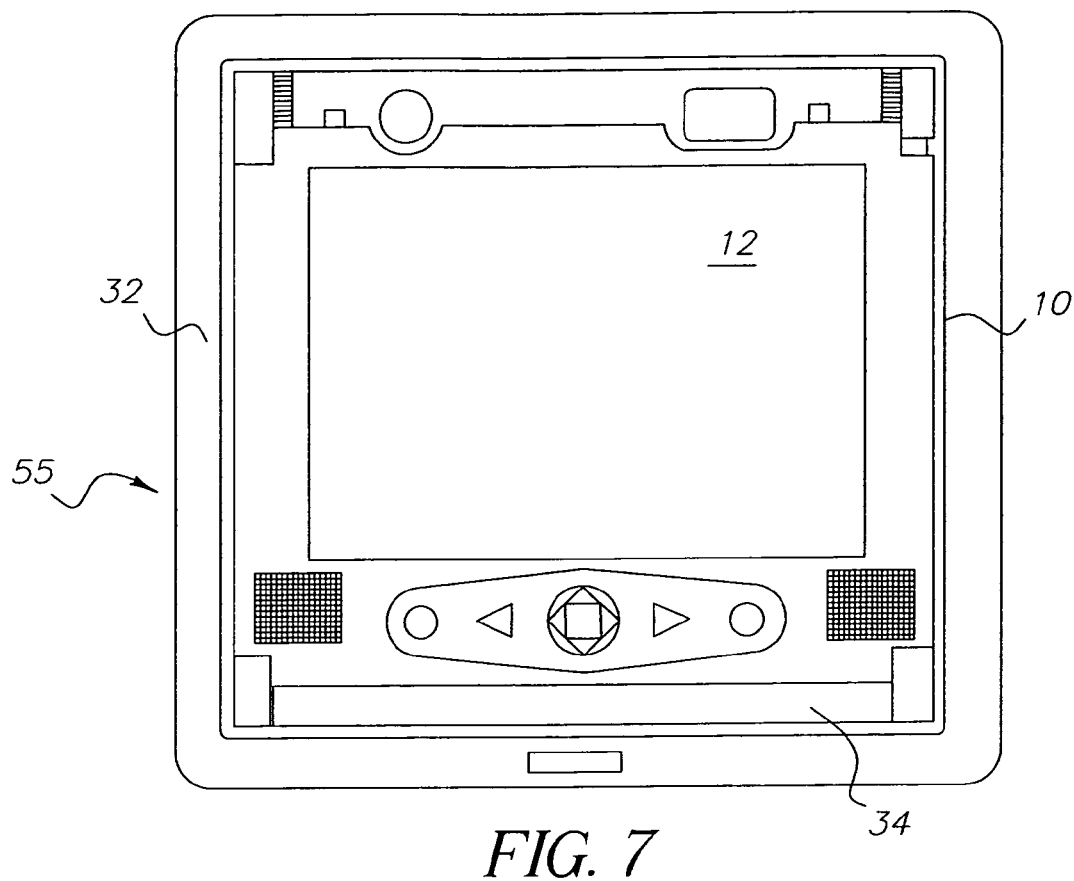
FIG. 7 shows a top view of the digital imaging system of FIG. 6 when the display device is folded back into a display recess.
Figure 8:
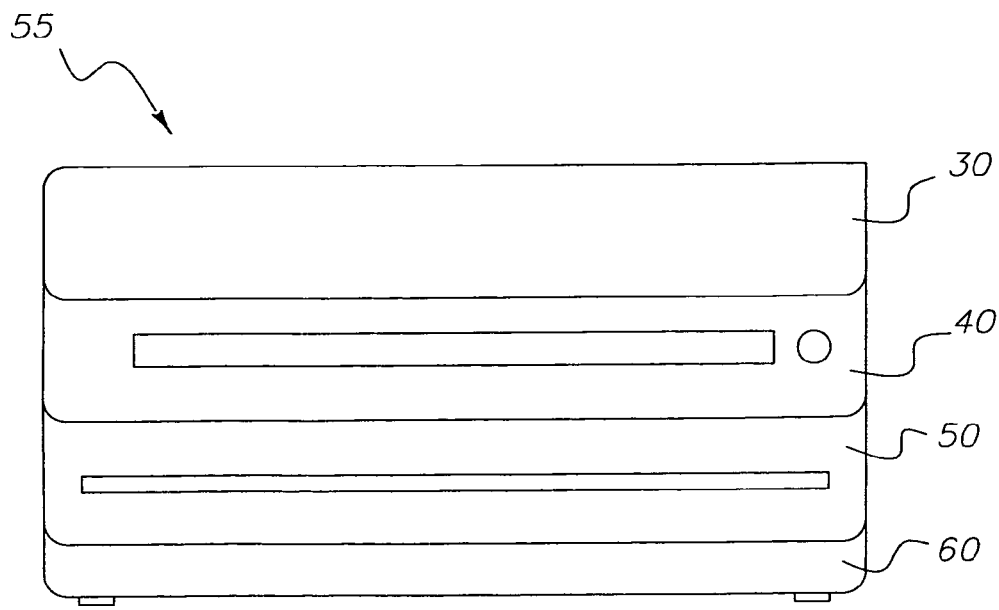
FIG. 8 shows a front view of the digital imaging system shown in FIG. 7.

Referring again to FIG. 6, display module 30 comprises a display recess 62. Support member 34 can be pivoted toward display recess 62, in the direction shown by arrow B, such that display device 10 is fully housed within display recess 62 with display 12 facing outward. FIG. 7 shows a top view of digital imaging system 55 when display device 10 is housed within display recess 62, and FIG. 8 shows a corresponding front view of digital imaging system 55. In this position, display device 10 is protected from being bumped or jarred, and could be transported in this configuration.

Figure 9:
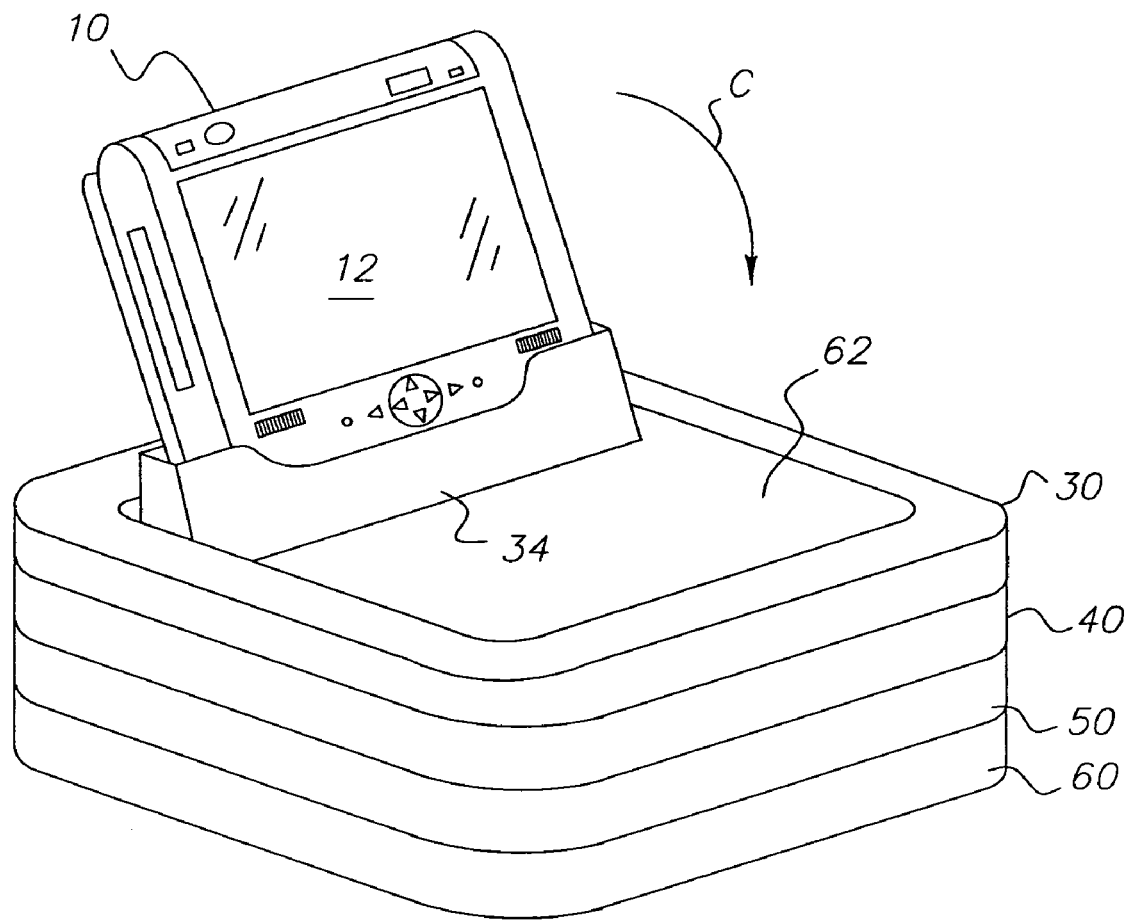
FIG. 9 shows an alternate arrangement of the support member within the display module.

FIG. 9 shows an alternate arrangement wherein support member 34 is pivoted in a direction shown by arrow C, such that when display device 10 is fully housed within display recess 62, display 12 is facing inward. In this position, display device 10 and display 12 are protected from being bumped or jarred, such as during transport. In a further embodiment, support member 34 may be translated between the two positions shown in FIGS. 6 and 9 so that a user can alternate housing display device 10 within display recess 62 with display 12 facing inward or outward.

Figure 10:
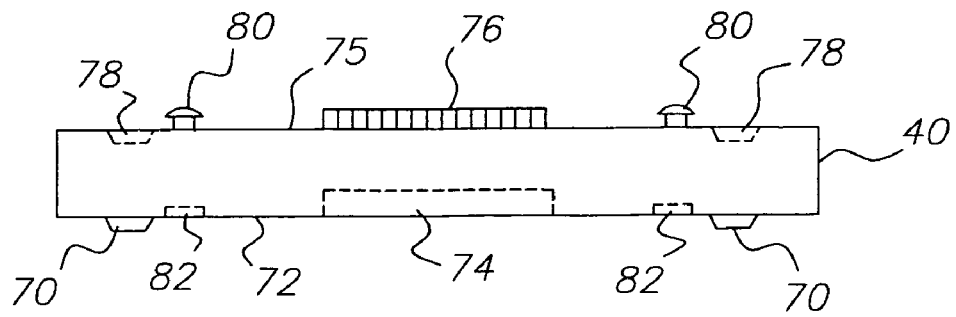
FIG. 10 shows a side view of a module in accordance with the present invention.
Figure 11:
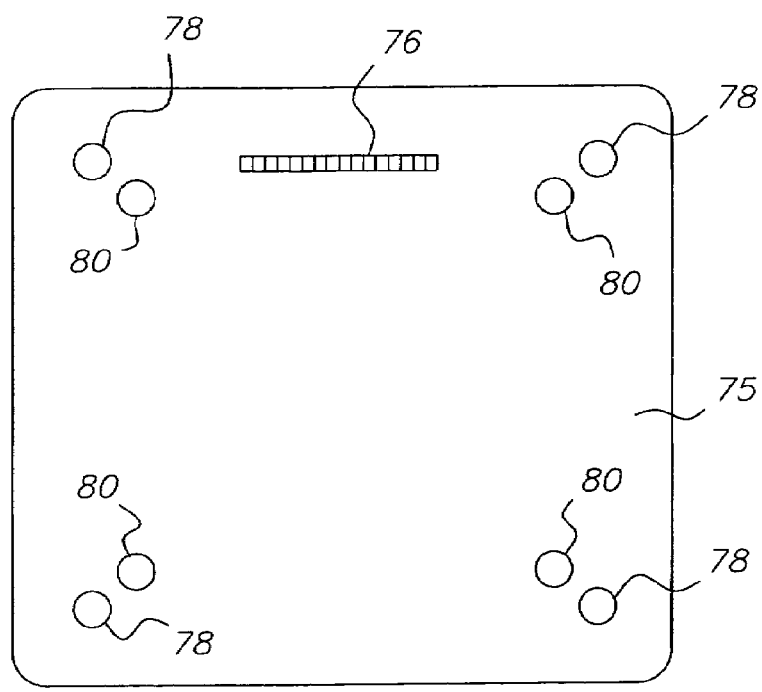
FIG. 11 shows a top view of the module of FIG. 10.
Figure 12:
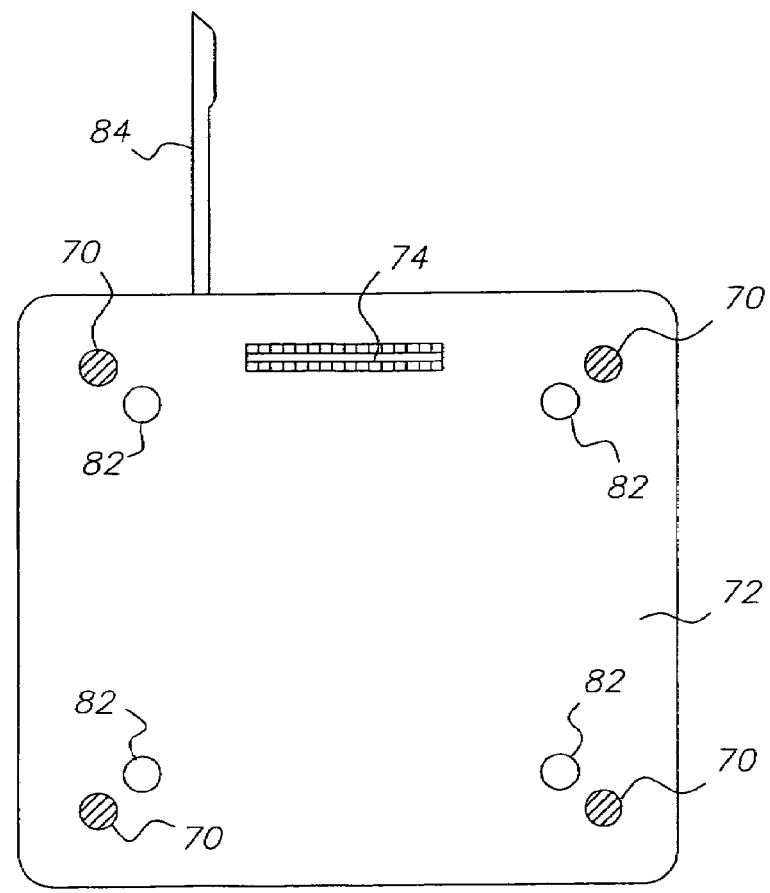
FIG. 12 shows a bottom view of the module of FIG. 10 with the module being in an unlocked position.
Figure 13:
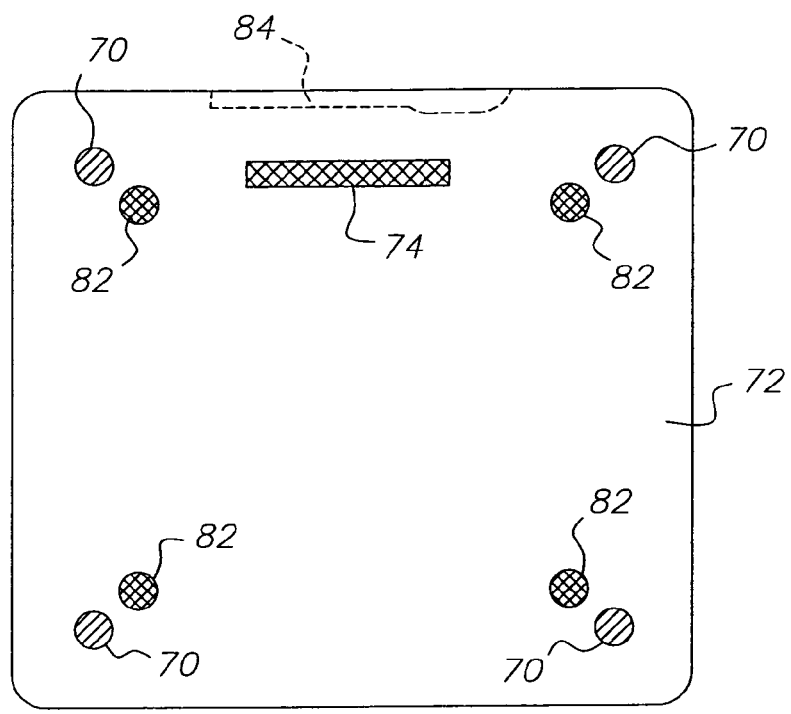
FIG. 13 shows a bottom view of the module of FIG. 10 with the module being in a locked position.

As aforementioned, the order of the modules is irrelevant since they are configured to be interchangeable. Referring now to FIGS. 10 through 14, the configuration of the modules (i.e., 40, 50, 60) is described with regard to their interchangeability. For ease of discussion reference is made to CD module 40 though, as indicated, 50, 60 have the same configuration. Note that the configuration for the modules need only be the same at the interface, and may be different in thickness and shape as necessary to accommodate their function. FIG. 10 shows a front view of CD module 40. FIG. 11 shows a top view of CD module 40. FIG. 12 shows a bottom view of CD module 40 with the module being in an unlocked position. While FIG. 13 shows a bottom view of CD module 40 with the module being in a locked position.

Figure 14:
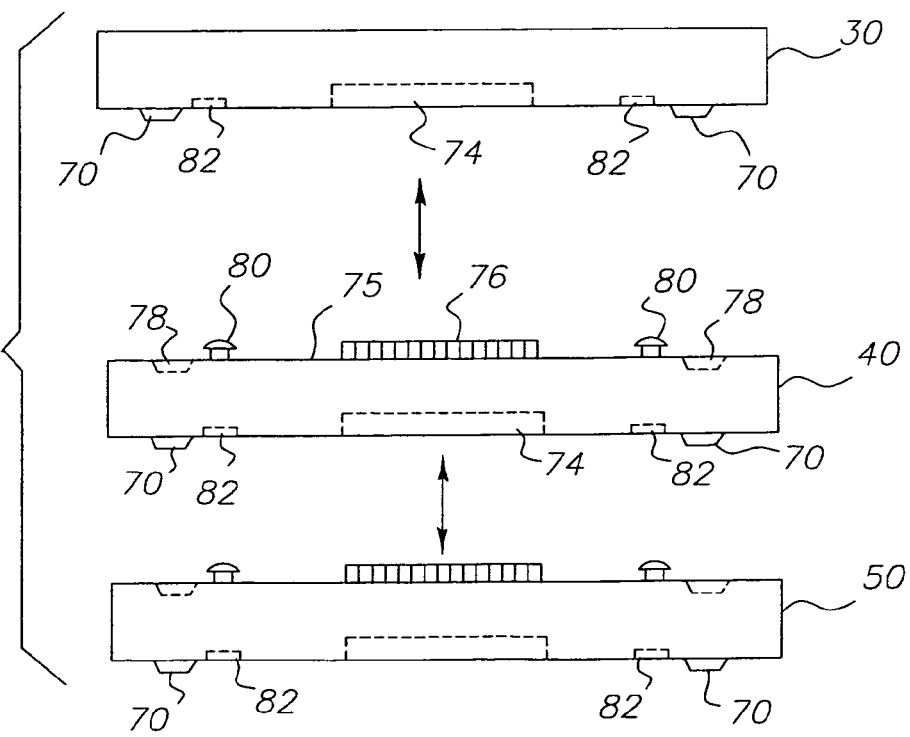
FIG. 14 shows a side view of several modules in a stacking arrangement.

CD module 40 comprises a plurality of support members or footers 70 disposed on a bottom side 72, as well as a female electrical connection portion 74. Disposed on a top side 75 of CD module 40 is a male electrical connection portion 76 adapted to mate with female portion 74 of an abutting module (for the particular example, display module 30, best shown in FIG. 14). Also disposed on top side 75 of CD module 40 are a plurality of footer receiving areas or detents 78 adapted to receive footers 70 of the abutting module (for the particular example, display module 30, as best shown in FIG. 14). The footers therefore provide both a locating and locking feature/function. Additionally, the footers may be constructed of an elastic material such as polyurethane capable of compression and capable of providing high friction. The compression may aid in the locking mechanism by providing spring action. The function of the footers when docked is to provide alignment and shock absorption. When not docked, the footers provide non-slip contact with the other surfaces and shock absorption. Further disposed on top side 75 is at least one attachment member 80 adapted to secure the modules. Attachment member 80 of CD module 40 mates with an attachment opening 82 disposed in bottom side 72 of an abutting module (for the particular example, display module 30, best shown in FIG. 14). Attachment members 80 can comprise an engagement surface for the locking mechanism to make contact against.

Figure 15:
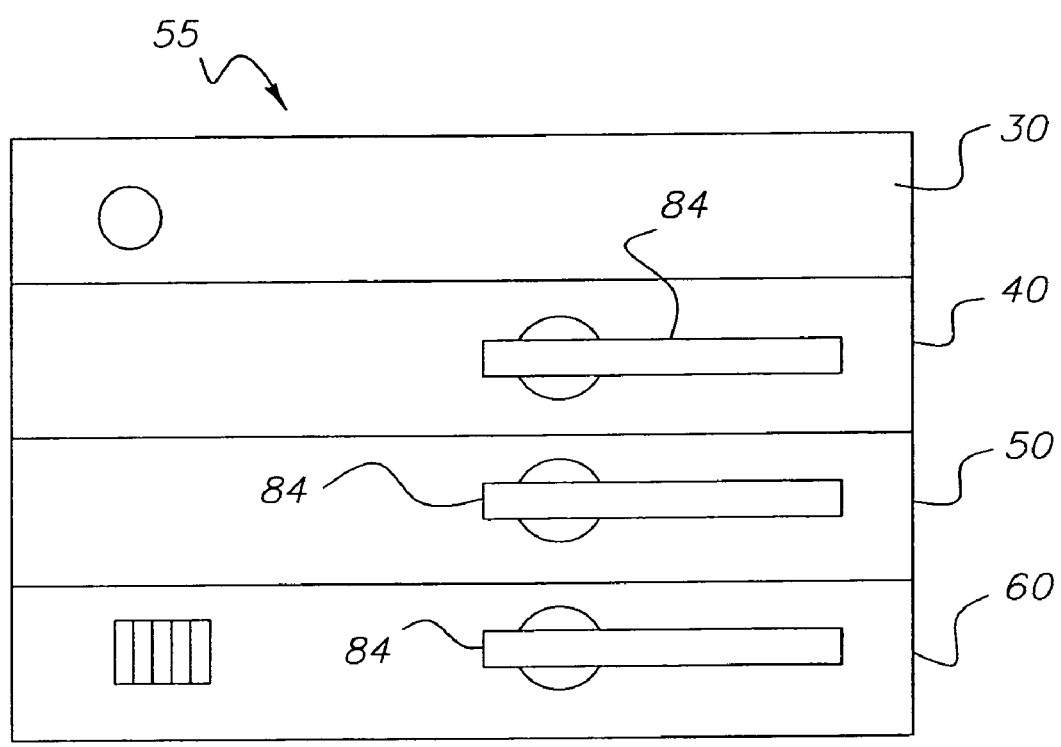
FIG. 15 shows a backside of the modular digital imaging system of FIG. 6.

In a preferred embodiment, attachment opening 82 and female portion 74 are protected by a cover from dust/dirt/debris when not being employed. When the module is to be docked with another module, the cover is moved to provide access to attachment opening 82 and female portion 74. FIG. 12 shows a lever 84 in an open position wherein attachment opening 82 and female portion 74 are accessible. FIG. 13 shows lever 84 in a closed position wherein attachment opening 82 and female portion 74 are not accessible for docking. However, once docked with another module, lever 84 can be moved to the closed position to secure/capture the module with another module. FIG. 15 shows a backside of digital imaging system 55 illustrating a plurality of levers 84 in the closed position.

Once docked, the electrical connection of the module is made with the other modules, particularly display module 30 which provides an interface to display device 10.

In a preferred embodiment, the user interface for digital imaging system 35, 55 is not contained with module 40, 50, 60. Rather, user control would be provided by display device 10 or display module 30. Accordingly, each time a module 40, 50, 60 is docked, software for the module would be uploaded or accessed by display device 10 or display module 30. This software may be uploaded from firmware within the modules or via the communications link 38 or via the removable digital memory device 16. As such, a cumulative user interface is provided. The user interface can be designed with a consistent look and feel for all modules added to the system.

Further, with such an arrangement, the user interface of digital imaging system 35, 55 could be changed/modified by changing a display/screen of display device 10. That is, different features could be accessible or not accessible depending on the display/screen of display device 10. For example, for a new user of a digital camera, a limited feature set could be provided whereas for a professional photographer, a more advanced feature set could be provided. In another example, display device 10 provides zoom and crop features only when a particular display/screen is used.

With the modules docked, the modules can be monitored and managed. For example, power management can be monitored, and power shifted to different modules as required. For example, printing images may be suspended during the time a CD is being written. In another example, memory can be shared between modules as required for example for queuing a large number of images or long segment of video.

Display module 30 can comprise more than one support member 34 to accommodate more than one display device 10. For example, it may be desired to charge more than one display device 10 at one time. Indeed, support member 34 (i.e., display module 30) can be configured to accept/receive more than one type/model of display device. Additionally, display devices 10 may be able to share data when connected to display module 30.

When display device 10 is docked within support member 34 of display module 30, CD module 40 can be configured to automatically download to a CD all new images stored on digital storage device 16 or newly transmitted images to display device 10 by means of a communication network. Printer module 50 can be likewise configured so that new images are automatically printed. The modules may store the filenames or other identification of digital data files that have been stored or printed so as to facilitate the identification of new digital data files for storage or printing. This technique may also be used for sharing images by means of the communications link 38.

As shown in FIG. 3, display device 10 operates in a display mode when docked in display module 30.

Figure 16:
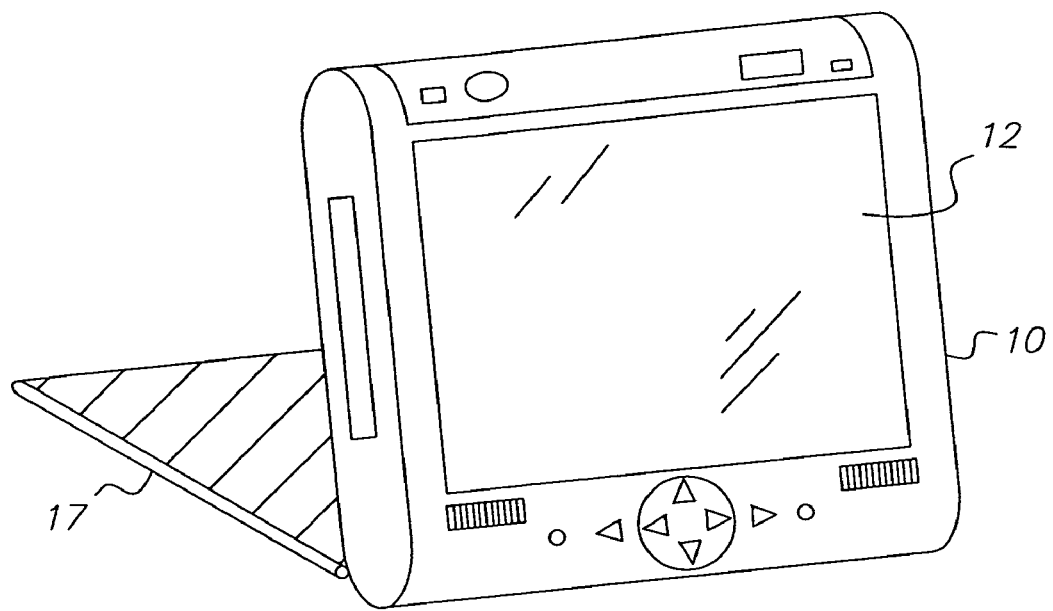
FIG. 16 shows a perspective view of the display device in a display mode.

Referring now to FIG. 16, cover member 17 can be employed as a stand or support device so that display device 10 can be supported without the use of display module 30. Alternatively, cover member 17 can be moved to partially or completely cover display 12, as shown in FIG. 17, thereby providing protection, shock absorption, and/or shielding of display 12, such as may be desired during transport or shipping.

If display device 10 is a digital camera (i.e., is adapted to capture images), then cover member 17 would be positioned as shown in FIG. 1 during the capture of an image.

Figure 17:
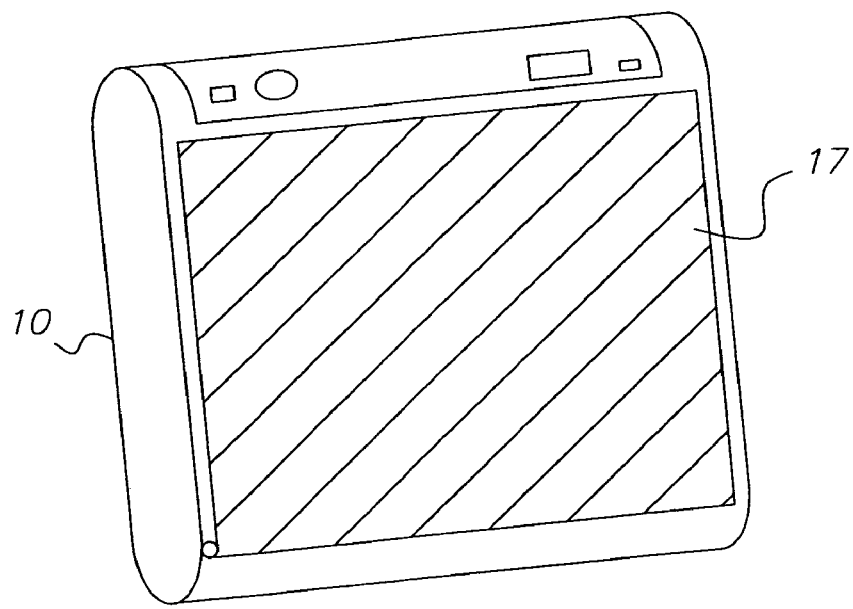
FIG. 17 shows a perspective view of the display device with the cover member covering the display.
Figure 18:
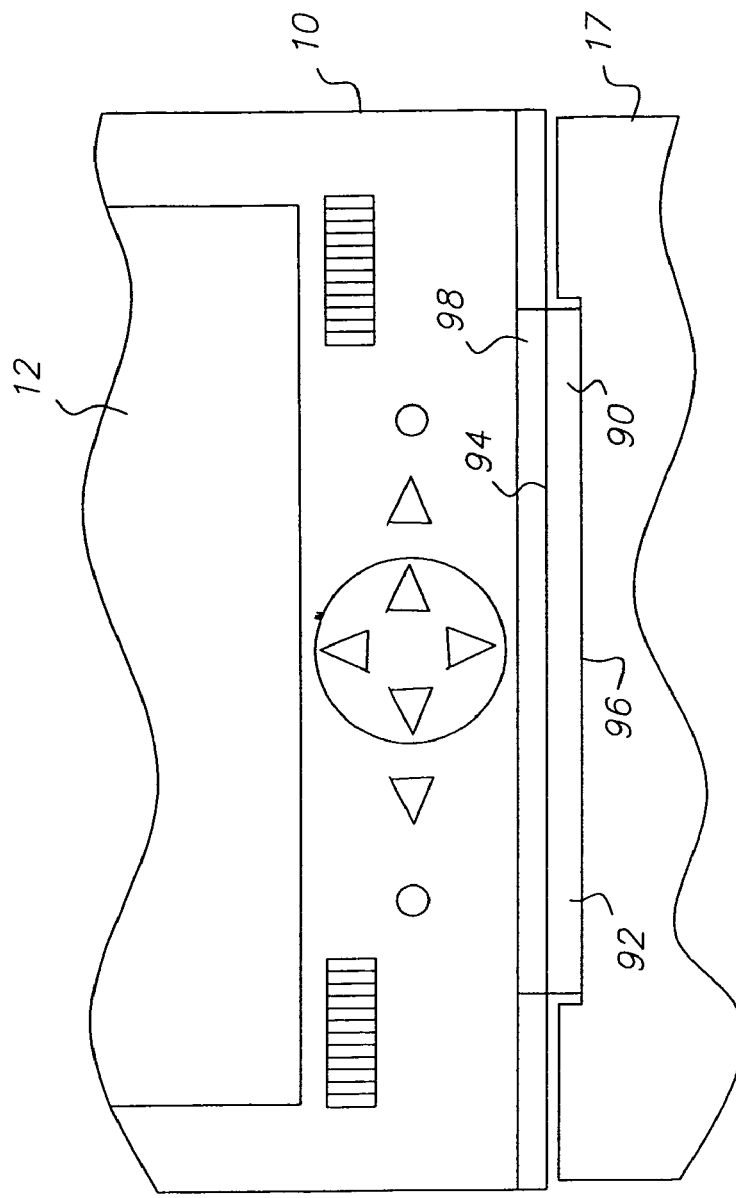
FIG. 18 shows a front view of a hinge mechanism hinging the cover member to the display device.
Figure 19:
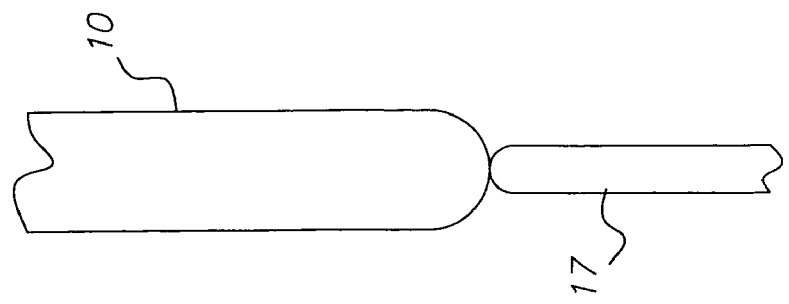
FIG. 19 shows a side view of FIG. 18.

As such, cover member 17 has three positions for three modes of operation: a camera mode (shown in FIG. 1), a display mode (shown in FIG. 16), and a protection/closed mode (shown in FIG. 17).

Referring now to FIGS. 18 through 22, cover member 17 comprises a dual hinged mechanism for movement between the three modes. Hinged mechanism 90 comprises a hinge 92 pivotally connected to display device 10 along a first hinge edge 94, and pivotally connected to cover member 17 along a second hinge edge 96. A connection portion 98 of display device 10 pivotally connected to hinge 92 along first hinge edge 94 is configured to rotate/pivot about an axis directed along first hinge edge 94. Similarly, cover member 17 is configured to rotate/pivot about an axis directed along second hinge edge 96. Each hinge can be operated independent of the other.

Figure 20:
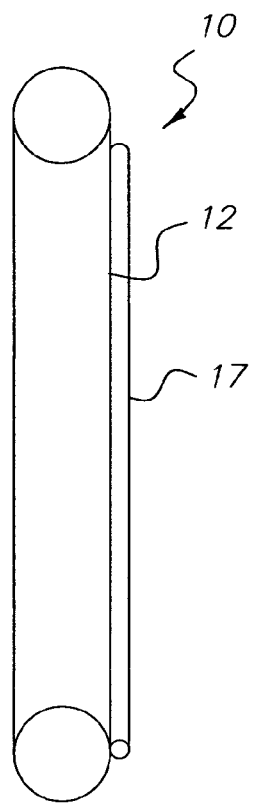
FIG. 20 shows a side view of the display device with the cover member covering the display.
Figure 21:
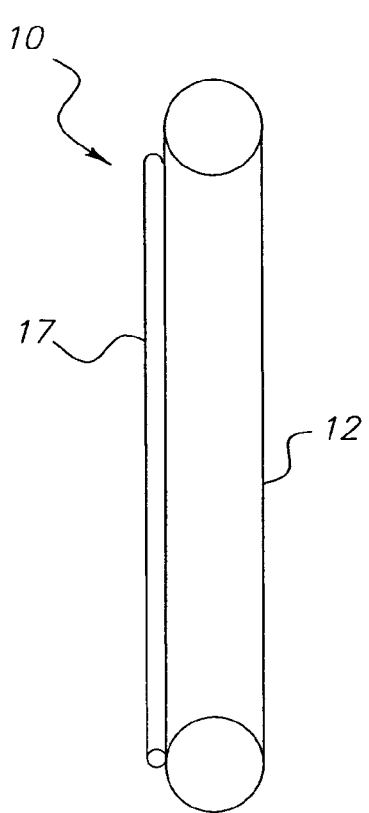
FIG. 21 shows a side view of the display device with the cover member folded back away from the display so as to be positioned adjacent a side opposite the display.
Figure 22:
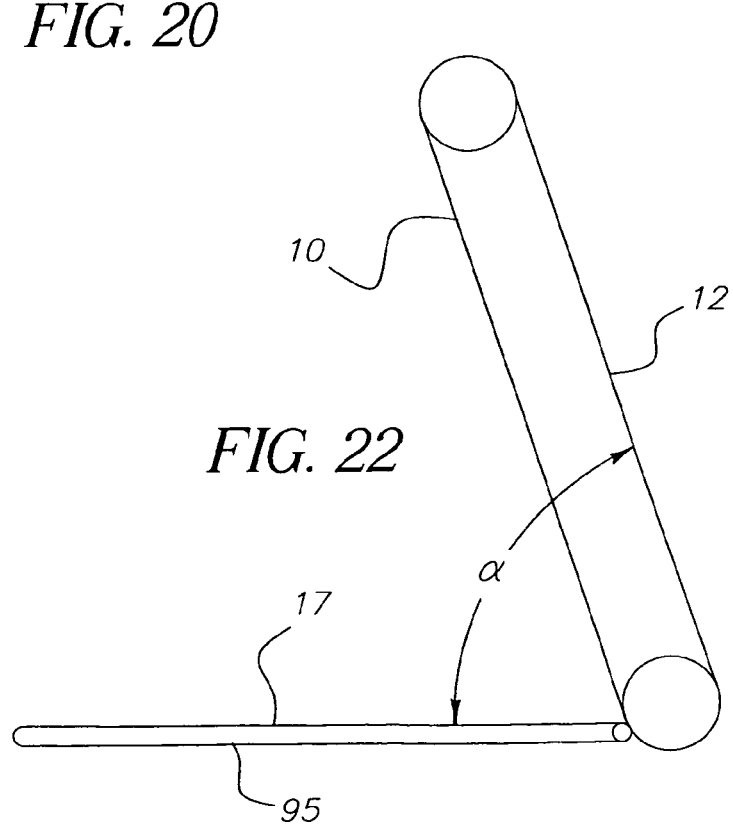
FIG. 22 shows the cover member supporting the display device in the display mode.
Figure 23C:
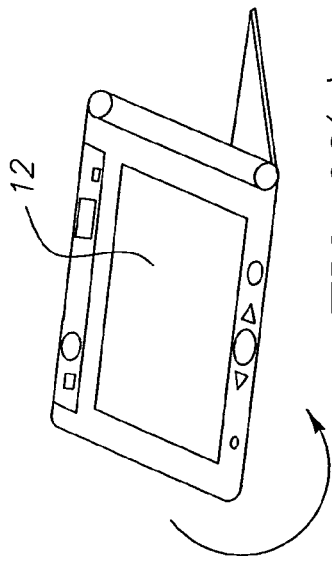
FIG. 23(a) through (g) shows the movement of the cover member relative to the display device.
Figure 23G:
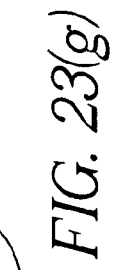
Figure 23B:
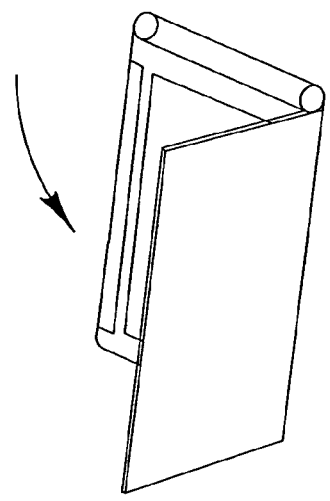
Figure 23F:
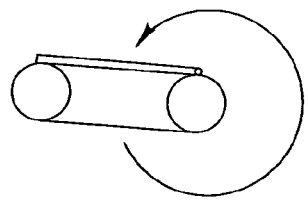
Figure 23A:
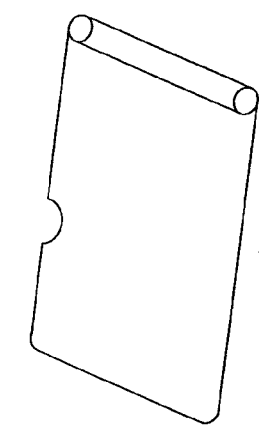
Figure 23E:
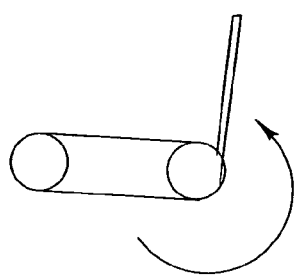
Figure 23D:
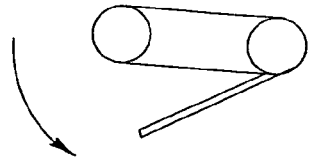

Hinged mechanism 90 provides for the movement of cover member 17 between the three modes. FIGS. 20 through 22 show a side view of display device 10 with cover member 17 disposed in the three modes. As shown in FIGS. 20 and 21, the thickness of display device 10 remains constant when cover member 17 is disposed on either side of the display device. As such, display device 10 can be positioned within support member 34 of display module 30 when cover member 17 is in the positions shown in FIGS. 20 and 21. When cover member 17 is placed adjacent a support surface, display 12 is viewable by a user. The angle α formed between display 12 and cover member 17 can be adjusted by a user for optimal viewing of display 12 by the user.

Cover member 17 may comprise a coating on one or more sides. For example, as shown in FIG. 22, one side of cover member 17 includes a coating 95. In the display mode shown in FIG. 22, coating 95 provides a non-skid, non-slip feature to secure display device 10. When cover member 17 is in the closed mode (FIG. 20), the same coating 95 provides shock absorption and protection for display 12 as well as a moisture shield. When cover member 17 is in the camera mode (FIG. 21), the same coating 95 provides a gripping, non-slip feature for grasping display device 10.

Materials which are suitable for use as coating 95 are known to those skilled in the art, and can comprise polymers, non-slip polymers, rubber materials, polyurethane materials, non-transfer adhesives.

FIGS. 23(a) through (g) provide another illustration of the movement of cover member 17 relative to display 12, and positioning display device 10 into the three modes of operation.

Figure 24:
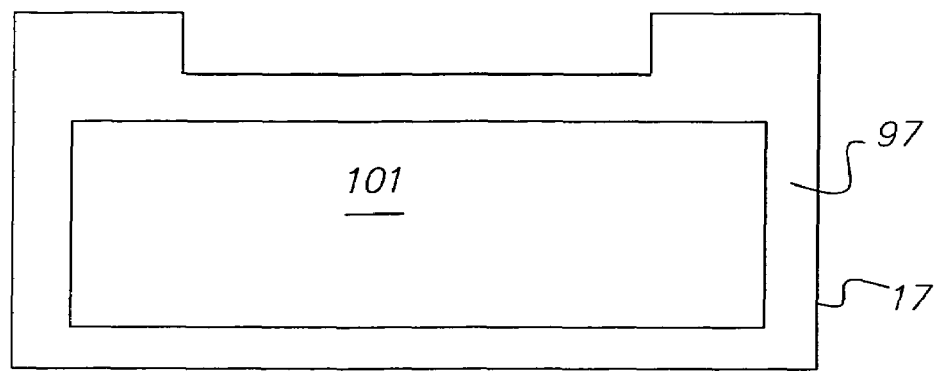
FIG. 24 shows a top view of a cover member comprising a transparent portion and an opaque portion.

Cover member 17 is shown as being opaque, such as being comprised of a metal or rigid plastic. However, portions of or all of cover member 17 may be transparent, whereby display 12 would be visible when cover member 17 is disposed in front of display 12. For example, FIG. 24 generally illustrates cover member 17 having an opaque portion 97 and a transparent portion 101, such as comprised of a transparent plexiglass or rigid plastic. Transparent portion 101 may be configured such that the display 12 remains at least partially visible. During capture mode, cover member 17 can protect display 12 while being used as a viewfinder.

The position of cover member 17 can automatically provide the mode of operation of display device 10. That is, automatic mode detection can be determined by the position of cover member 17. For example, moving cover member 17 to the camera mode would automatically activate the power of display device 10. Similarly, when cover member 17 is moved to the closed mode, display device 10 may be automatically powered down. Likewise, when cover member 17 is moved to the closed mode, other features of display device 10 may automatically powered down or moved/rotated to a "closed/off" position. For example, flash member 22 (shown in FIG. 1) may be moved/rotated to a covered/shut position when cover member 17 is moved to the closed mode.

Figure 25:
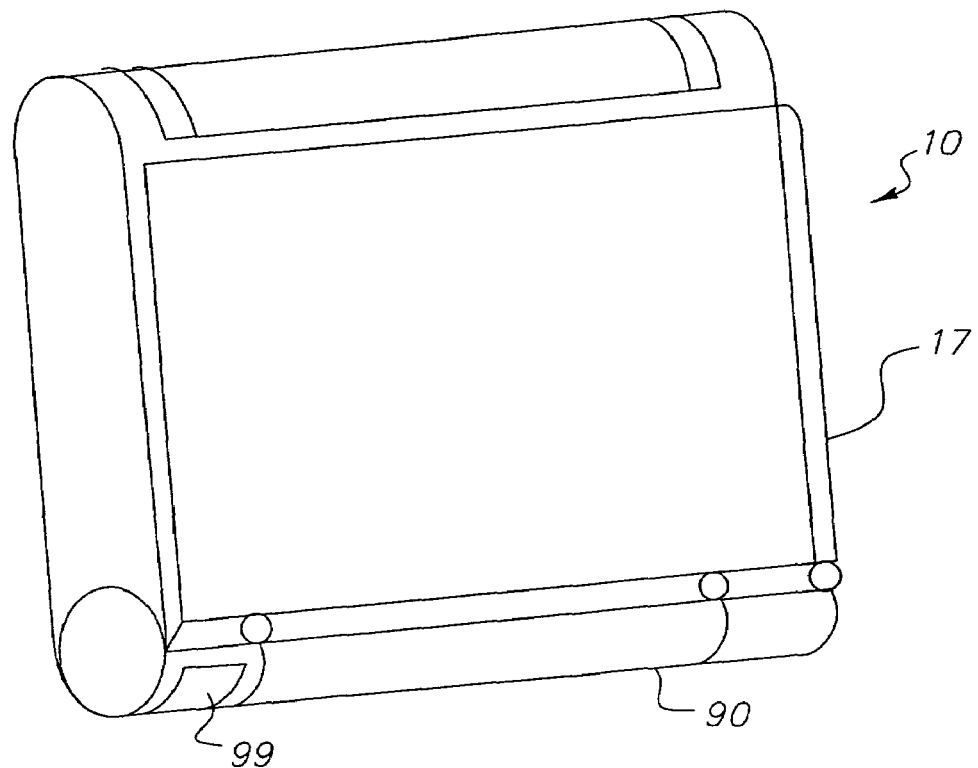
FIG. 25 shows a perspective with of the display device illustrating the hinged mechanism and a USB port location.
Figure 28:
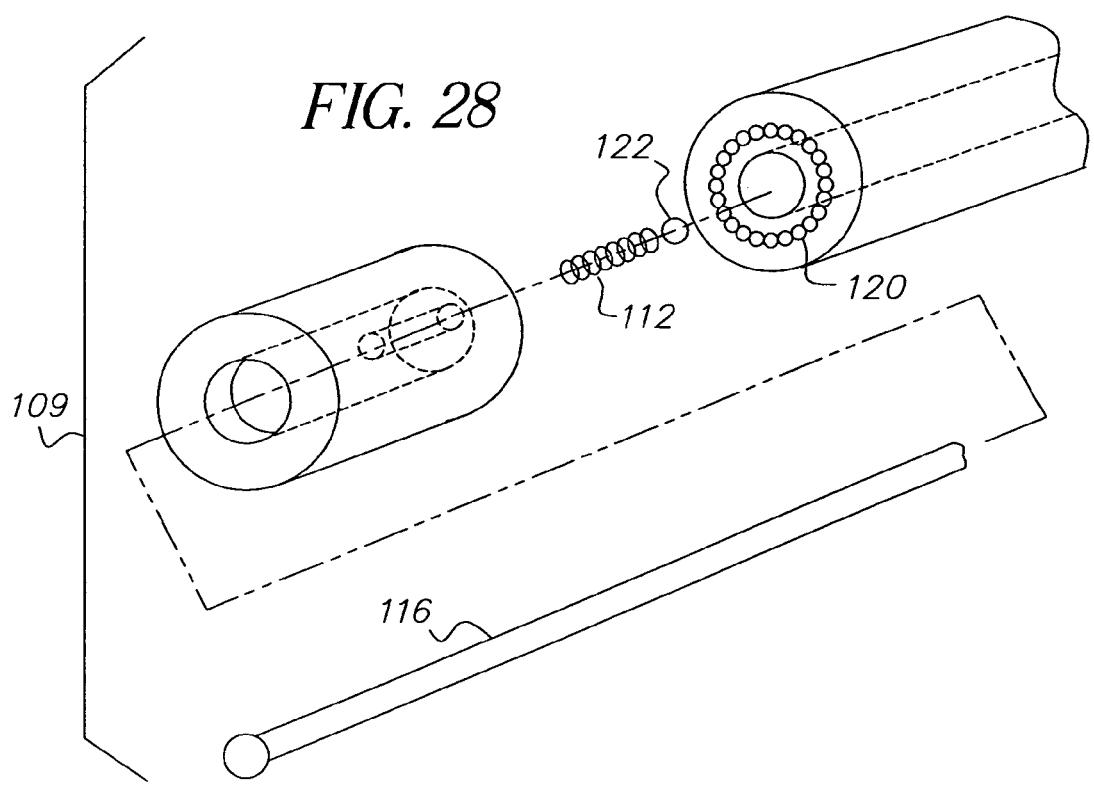
FIGS. 28-31 show a perspective view of roller bearing elements.
Figure 29:
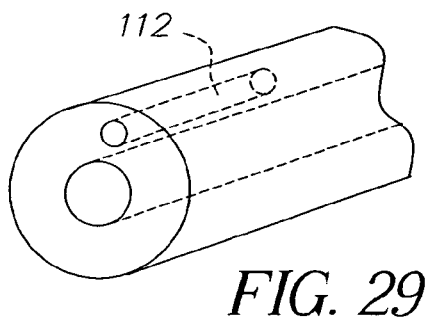
Figure 30:
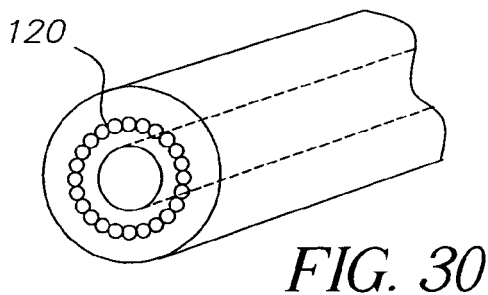
Figure 31:
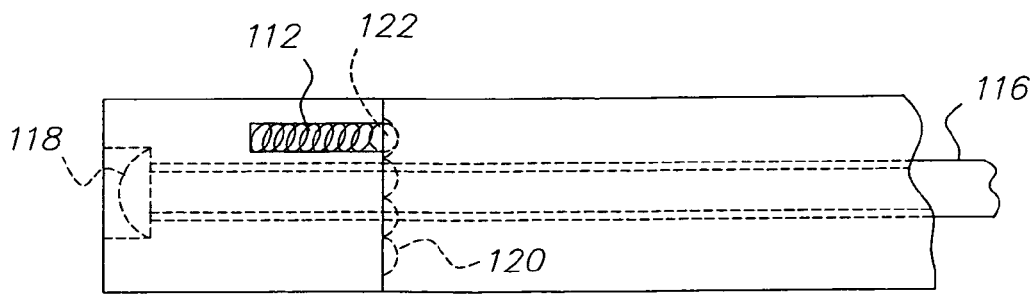

Other arrangements for hinged mechanism 90 may be known to those skilled in the art. For example, FIG. 25 shows cover member 17 in the closed mode, wherein a portion of cover member 17 is hinged, thereby permitting a stationary USB connection 99 to be disposed along a stationary (non-rotatable) bottom edge of display device 10.

It is noted that the electrical connection between display module 30 and the other functional modules (e.g., CD module 40, printer module 50) provides an electrical interface between all the devices. Therefore, the display device 10 is electrically interfaceable with all the functional modules, including CD module 40 and printer module 50 even though the electrical connector 99 on display device 10 does not physically mate/contact/connect to the modules.

FIGS. 26 through 31 show alternate arrangements for hinged mechanism 90. As illustrated, a clutch is employed comprising a clutch pad 110, spring 112, thumbwheel 114, threaded shaft 116, and a nut/cavity 118. Thumbwheel 114 is loosened or tightened for spacing of clutch pad 110. Clutch pad 110 can be comprised of Teflon or similar materials. Detents 120 and ball probe 122 can be employed to provide discrete movement of the cover member, as shown in FIGS. 28 through 31.

Those skilled in the art will recognize that other types of clutches can be employed, for example, pressure clutches, magnetic clutches, friction clutches, and interference fit.

As indicated above, a cumulative user interface can be generated for the system. This cumulative user interface can control, from display device 10, all the various configurations that can be formed from stacking the different modules in different orders.

In a preferred embodiment, the cumulative graphical user interface is developed using a user interface design tool (for example, the tool called UiMagi, as described below) that uses a simple script-like language for producing various file system streams that describes the graphical user interface which controls the functions of the various modules. Each of the modules stores a file system stream to control the function of that module. When modules are "docked" (i.e., stacked, mated) with the display device, the file system stream data is automatically transferred to the display device from the module, for example by means of electrical connector 99. The display device then employs a runtime engine (for example, the engine called Chimera, further described below) that uses the file system stream data from the various modules to provide a graphical user interface to control the module(s).

The tool called UiMagi and the engine called Chimera are more particularly described in commonly assigned provisional application Ser. No. 60/358,815 filed on Feb. 22, 2002 and perfected as U.S. Ser. No. 10/368,171, titled "SYSTEM AND METHOD FOR CREATING GRAPHICAL USER INTERFACES" on Feb. 18, 2003 in the names of Belz et al, herein incorporated by reference.

Using Chimera allows the GUI of display device 10 to be readily changed upon the docking of additional modules. To accomplish this, Chimera provides mechanisms to create dynamically bound user interface elements to other user interface elements.

Figures 32, 32B:
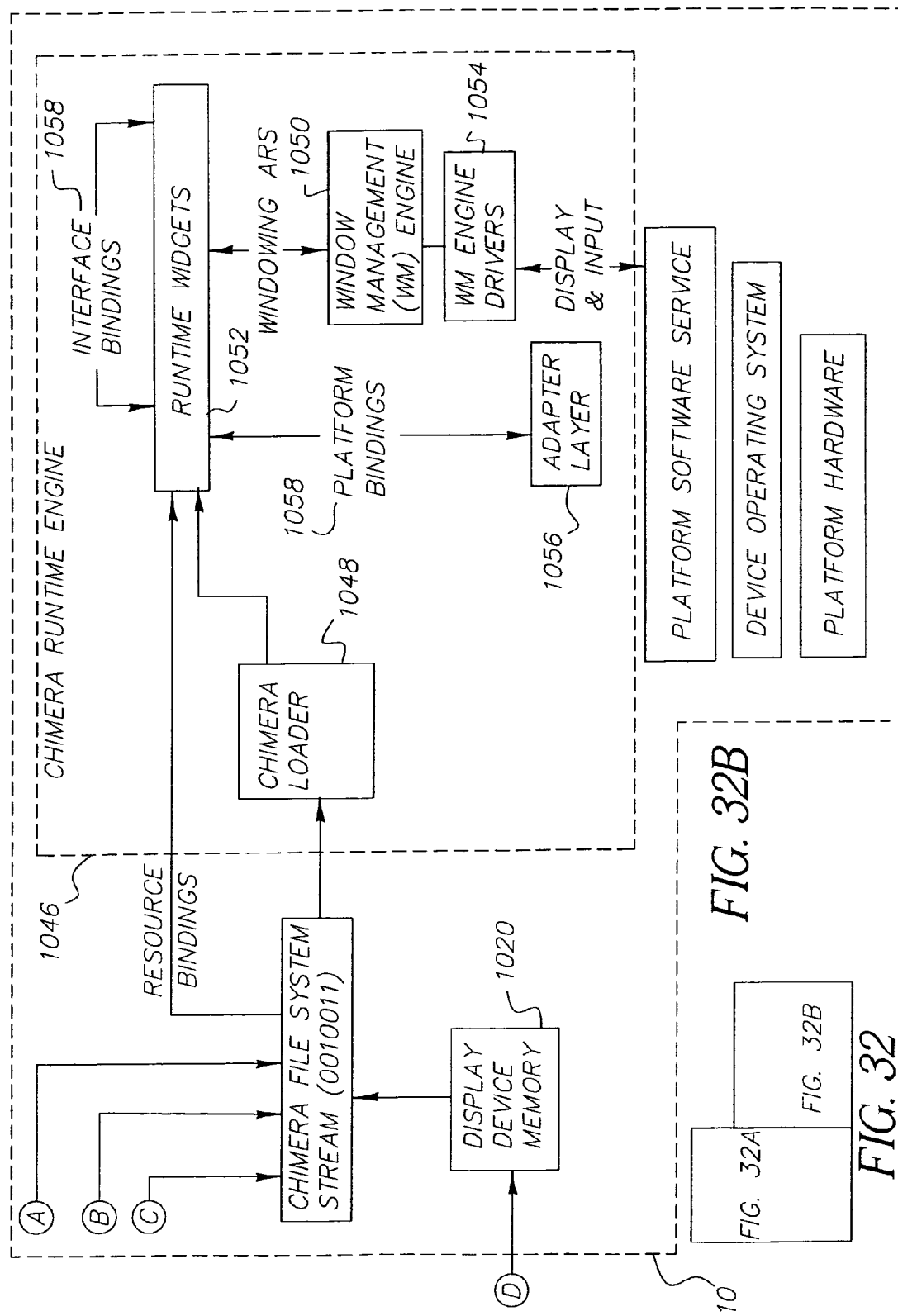
FIG. 32 is a block diagram illustration the interrelationship between FIGS. 32A and 32B.
FIG. 32B is a schematic diagram of the Chimera runtime engine for dynamically translating data into a graphical user interface.
Figure 32A:
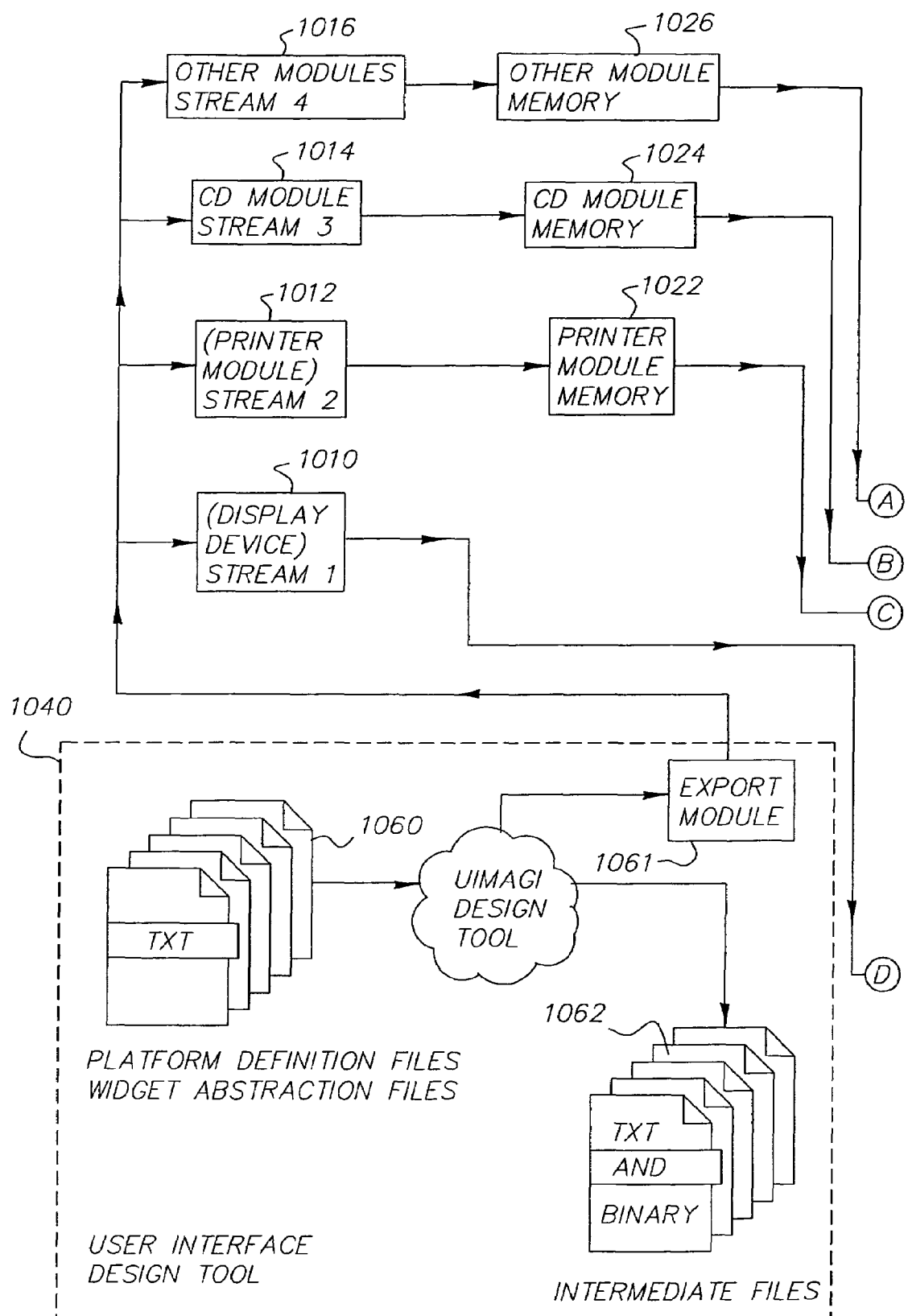
FIG. 32A is a schematic diagram of the user interface design tool (UiMagi) and a platform for implementing the Graphical User Interface (GUI) provided by UiMagi.

FIGS. 32A and 32B illustrates the design and implementation of the cumulative user interface. As shown in FIG. 32A, UiMagi 1040 creates a series of data streams 1010, 1012, 1014, 1016. These data streams are adapted to configure the graphical user interface to control the functions of the various functional modules from the display device. In particular, data stream 1010 is stored in display device memory 1020 and controls the normal operation of display device 10 when display device is operating independent/separate of the other modules.

Similarly, data stream 1012 is stored in printer module memory 1022 within printer module 50 and controls the normal operation of printer module 50 by providing data to configure the graphical user interface of display device 10 to control the function of printer module 50 from display device 10 when printer module 50 is stacked/docked with display device 10.

Likewise, data stream 1014 is stored in CD module memory 1024 within CD module 40 and controls the normal operation of CD module 40 by providing data to configure the graphical user interface of display device 10 to control the function of CD module 40 from display device 10 when CD module 40 is stacked/docked with display device 10.

As indicated above, other modules can be employed. As such, data stream 1016 is stored in other module memory 1026 within the other module and controls the normal operation of the other module by providing data to configure the graphical user interface of display device 10 to control the function of the other module from display device 10 when the other module is stacked/docked with display device 10.

Referring to FIGS. 32A and 32B. The Chimera runtime engine 1046 within display device 10 provides a loader 1048 adapted to read data stream 1010 from display device memory 1020, and, when connected in a docking/stacking configuration, to upload one or more data streams (i.e., 1012, 1014, 1016) from the corresponding memory of the functional module(s) (e.g., CD module 40, printer module 50).

The Chimera runtime engine 1046 translates the data streams into a dynamically created interface, which is displayed on display 12. The interface is created by the use of a window management engine 1050, which provides mechanisms to create layers of graphical elements, which are referred to as Runtime Widgets 1052. The window management engine 1050 accesses platform hardware events and display surface through drivers 1054 that are stored in display device memory 1020.

An adapter layer 1056 is provided in conjunction with Chimera runtime engine 1046 in such a way that it can be bound to the user-interface as encoded in the interface definition files. Widgets 1052 can also bind to resources in Chimera file system stream as well as other widgets, again as specified by the interface definition files. Chimera loader 1048 is responsible for switching interfaces as various functional modules are docked/stacked/mated, providing access to resources available in the data streams 1010-1016 and binding data and events using Chimera binding mechanisms 1058.

UiMagi 1040 is a host-based tool that allows a non-technical person to act as a GUI designer to create embedded GUIs graphically on a host computer. The design can then be exported in a platform specific format to be deployed on display device 10 without further involvement from the embedded software developer. UiMagi 1040 uses Platform Definition Files (PDF) 1060 to tailor the editing process for the type of microprocessor used in the specific display device 10. PDFs 1060 describe the characteristics of the particular microprocessor using a simple, ASCII text based language called the Platform Definition Language (bv, not shown). The PDF is maintained by the embedded GUI developer 1022 and thus guarantees that the resulting data streams 1010-1016 from UiMagi 1040 will be compatible with the microprocessor within display device 10 when the cumulative user interface is rendered.

A Platform Export Module 1061 (PEM) converts platform independent designs to a platform specific format. UiMagi is modular and only contains the core functionality needed to provide graphical editing of user interfaces. It utilizes this PEM to generate platform specific format that can be used by the Chimera runtime engine 1046 on display device 10.

Chimera runtime engine 1046 uses data streams 1010-1016 to dynamically instantiate and present the user interfaces created with UiMagi. The data streams 1010-1016 store a variety of resources, which include the Chimera Definition Files (CDFs) that describe individual interfaces.

UiMagi generates the CDFs (one of the intermediate files 1062) that contain the complete specification of the components that make up specific user interfaces. This includes the definition of the widgets that need to be created and the platform specific functionality that they bind to. Chimera runtime engine 1046 employs dynamic binding mechanisms to tie together the GUI to the rest of the device platform. The CDF also contains references to graphics, fonts and other resources that are provided to the runtime engine by Chimera file stream. This promotes modularity and allows each of these components (graphics, fonts, sound, etc.) to be changed independently of each other. In one embodiment, an x86/Win32 form of Chimera is used by UiMagi tool as an emulator and debugger for interfaces.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 display device
12 display
13 speaker
14 receiving port
16 digital storage device
17 cover member
18 selection members
20 aperture; for stylus
22 flash member/illumination device
24 communication port
26 lower edge
30 display module
32 body
34 support member
35 digital imaging system
36 recess
37 electrical connector
38 telephone connector/communications link
40 CD module
42 opening
50 printer module
52 hardcopy print
54 delivery aperture
55 digital imaging system
60 other module
62 display recess
70 module support members; footers
72 bottom side
74 female electrical connection portion
75 top side
76 male electrical connection portion
78 footer receiving area; detent
80 attachment member
82 attachment opening
84 lever
90 dual hinged mechanism
92 hinge
94 first hinge edge
95 coating
96 second hinge edge
97 opaque portion
98 connection portion
99 USB connection
101 transparent portion
110 clutch pad
112 spring
114 thumb wheel
116 threaded shaft
118 nut/cavity
120 detents
122 ball probe 1010-1016 data streams
1020 display device memory
1022 printer module memory
1024 CD module memory
1026 other module memory
1040 user interface design tool (UiMagi)
1046 Chimera runtime engine
1048 Chimera loader
1050 window management engine
1052 runtime widgets
1054 drivers
1056 adapter layer
1058 binding mechanisms
1060 Platform Definition File (PDF)
1061 Platform Export Module (PEM)
1062 intermediate files

What is claimed is:

1. Apparatus comprising:
a hand held camera comprising a camera body, a display disposed in the camera body for displaying image data stored in the camera and for displaying a graphical user interface, and a communication port accessible for a first mating connection through an opening in the camera body; and
a support module comprising a support member for supporting the camera, the support module including a support module body having a communication connector disposed therein for completing the first mating connection with the communication port of the camera while supporting the camera, the support module including means for detecting the first mating connection of the communication connector to the communication port and, in response thereto, a runtime engine that automatically uploads display control information from the support module via the first mating connection; wherein the runtime engine translates the display control information from the support module into a dynamically created graphical user interface that is displayed on the display.

2. Apparatus of claim 1, wherein the support module further comprises a second communication port accessible for a second mating connection through an opening in the support module body when the support module body is abutting another module, and the apparatus further comprises a first functional module comprising a first functional module body and a second communication connector disposed in the first functional module body for completing the second mating connection to the second communication port when abutting the support module, the first functional module including means for detecting the second mating connection of the second communication connector to the second communication port and, in response thereto, for automatically uploading display control information through the second mating connection then through the first mating connection to the camera for enabling the runtime engine to translate the display control information from the first functional module and the display control information uploaded through the second mating connection into a dynamically created graphical user interface that is displayed on the display.

3. Apparatus of claim 2, wherein the camera further comprises buttons disposed in the camera body for operating the graphical user interface to control the support module and the first functional module.

4. Apparatus of claim 2, wherein the first functional module comprises a printer.

5. Apparatus of claim 2, wherein the first functional module comprises an optical disc reader and writer.

6. Apparatus of claim 2, wherein the first functional module further comprises a third communication port accessible for a third mating connection through an opening in the first functional module body when the first functional module body is abutting another functional module, and the apparatus further comprises a second functional module including a second functional module body and a third communication connector disposed in the second functional module body for completing the third mating connection to the third communication port when abutting the first functional module, the second functional module including means for detecting the third mating connection of the third communication connector to the third communication port and, in response thereto, for automatically uploading second function display control information through the third mating connection to the camera for enabling the runtime engine to translate the display control information from the second functional module into a dynamically created graphical user interface that is displayed on the display.

7. Apparatus of claim 6, wherein the first functional module comprises a printer and the second functional module comprises an optical disc reader and writer.

8. Apparatus of claim 2, wherein each one of the modules and the camera comprise means for transmitting and receiving data from any other one of the modules and the camera via the mating connections.

9. A method for providing a graphical user interface on a hand held display, comprising the steps of:
providing a hand held display for displaying digital images stored in the hand held display and for displaying a graphical user interface included in the hand held display, the hand held display including a first electrical connector disposed therein for fitting to a first complementary electrical connector;
providing a first functional module including the first complementary electrical connector disposed therein;
fitting the first electrical connector disposed in the hand held display with the first complementary electrical connector disposed in the functional module including forming a mating connection therebetween;
the first functional module detecting the mating connection of the first electrical connector and the first complementary electrical connector and, in response thereto, uploading display control information through the mating connection to the hand held display; and
a runtime en ne to translate display control information from the first functional module into a dynamically graphical user created interface that is displayed on the display.

10. The method of claim 9, wherein the first functional module comprises a second electrical connector disposed therein for fitting to a second complementary electrical connector, and further comprising the steps of:
providing a second functional module including the second complementary electrical connector disposed therein;
fitting the second electrical connector disposed in the first functional module with the second complementary electrical connector disposed in the second functional module, when the first functional module abuts the second functional module, including forming a second mating connection therebetween;
the second functional module detecting the mating connection of the second electrical connector and the second complementary electrical connector and, in response thereto, uploading second display control information through the mating connection of the second electrical connector and the second complementary electrical connector then through the mating connection of the first electrical connector and the first complementary electrical connector to the hand held display; and responsive to the second display control information, dynamically configuring, via a runtime engine that translates the second control information, the graphical user interface included in the display to control functionality of the second functional module via the mating connection of the first electrical connector and the first complementary electrical connector then via the mating connection of the second electrical connector and the second complementary electrical connector.

11. The method of claim 9, wherein the functionality of the first functional module comprises a printing function.

12. The method of claim 10, wherein the functionality of the first functional module comprises a printing function and the functionality of the second functional module comprises an optical disc reading and writing function.

13. The method of claim 10, further comprising the steps of:

providing buttons on the hand held display for operating the graphical user interface to control the functionality of the first and second functional modules.

14. Apparatus comprising:

a display device comprising a display device body, a display screen disposed in the display device body for displaying image data stored in the display device and for displaying a graphical user interface, and a first communication port accessible for a first mating connection through an opening in the display device body;

a support module including a support member for supporting the display device, a support module body, a first communication connector disposed in the support member for effecting the first mating connection to the first communication port of the display device while supporting the display device, a second communication port accessible for a second mating connection through an opening in the support module body when the support module body abuts another module, the support module further including means for detecting a connection of the first communication connector to the first communication port and, in response thereto, a runtime engine that automatically uploads display control information to the display device; wherein the runtime engine translates the display control information from the support module into a dynamically created graphical user interface that is displayed on the display; and a first functional module including a first functional module body and a second communication connector disposed in the first functional module body for effecting the second mating connection to the second communication port of the support module when the first functional module abuts the support module body, the first functional module including means for detecting a connection of the second communication connector to the second communication port and, in response thereto, the runtime engine automatically uploads display control information to the display device via the second communication port then the first communication port for enabling the runtime engine to translate the display control information from the first functional module into a dynamically created graphical user interface that is displayed on the display.

15. Apparatus of claim 14, wherein the display device further comprises buttons disposed in the display device body for operating the graphical user interface to control the support module and the first functional module.

16. Apparatus of claim 14, wherein the first functional module further comprises a third communication port accessible for a third mating connection through an opening in the first functional module body when the first functional module body abuts another functional module, and the apparatus further comprises a second functional module including a second functional module body and a third communication connector disposed in the second functional module body for effecting the third mating connection to the third communication port when the second functional module abuts the first functional module, the second functional module including means for detecting a connection of the third communication connector to the third communication port and, in response thereto, for automatically uploading second function display control information to the display device via the third communication port then the second communication port then the first communication port for enabling the runtime engine to translate the second function display control information from the second functional module into a dynamically created graphical user interface that is displayed on the display.

17. Apparatus of claim 16, wherein the display device further comprises buttons disposed in the display device body for operating the graphical user interface to control the support module, the first functional module, and the second functional module.

* * * * *

UNITED STATES PATENT AND TRADEMARK OFFICE
CERTIFICATE OF CORRECTION

| | | |
|---|---|---|
| PATENT NO. | : 7,503,011 B2 | Page 1 of 1 |
| APPLICATION NO. | : 10/397696 | |
| DATED | : March 10, 2009 | |
| INVENTOR(S) | : Larry W. Wilkinson et al. | |

It is certified that error appears in the above-identified patent and that said Letters Patent is hereby corrected as shown below:

Column 14, Line 46      In Claim 9 (number 18 in Amendment), delete "en ne" and insert --engine--

Signed and Sealed this

Twelfth Day of October, 2010

David J. Kappos
*Director of the United States Patent and Trademark Office*